US008443387B2

(12) United States Patent
Gordon et al.

(10) Patent No.: US 8,443,387 B2
(45) Date of Patent: May 14, 2013

(54) METHOD AND APPARATUS FOR DELIVERING AND DISPLAYING INFORMATION FOR A MULTI-LAYER USER INTERFACE

(75) Inventors: Donald F. Gordon, Los Altos, CA (US);
Sadik Bayrakeri, Foster City, CA (US);
John P. Comito, Redwood City, CA (US)

(73) Assignee: Cox Communications, Inc., Atlanta, GA (US)

( * ) Notice: Subject to any disclaimer, the term of this patent is extended or adjusted under 35 U.S.C. 154(b) by 1413 days.

(21) Appl. No.: 11/762,868

(22) Filed: Jun. 14, 2007

(65) Prior Publication Data
US 2007/0283390 A1    Dec. 6, 2007

Related U.S. Application Data

(62) Division of application No. 09/729,660, filed on Dec. 4, 2000, now abandoned.

(60) Provisional application No. 60/253,417, filed on Nov. 27, 2000.

(51) Int. Cl.
*G06F 3/00* (2006.01)
*G06F 13/00* (2006.01)
*H04N 5/445* (2006.01)

(52) U.S. Cl.
USPC .................................. 725/43; 725/44; 725/54

(58) Field of Classification Search ............... 725/37–61
See application file for complete search history.

(56) References Cited

U.S. PATENT DOCUMENTS

| | | | |
|---|---|---|---|
| 5,247,363 A | | 9/1993 | Sun et al. |
| 5,485,221 A | | 1/1996 | Banker et al. |
| 5,510,842 A | | 4/1996 | Phillips et al. |
| 5,596,373 A | | 1/1997 | White et al. |
| 5,642,153 A | | 6/1997 | Chaney et al. |
| 5,729,279 A | | 3/1998 | Fuller |
| 5,822,014 A | | 10/1998 | Steyer et al. |
| 5,841,433 A | | 11/1998 | Chaney |
| 5,844,620 A | * | 12/1998 | Coleman et al. ................. 725/54 |
| 5,867,207 A | | 2/1999 | Chaney et al. |
| 5,926,230 A | | 7/1999 | Niijima et al. |
| 5,946,045 A | | 8/1999 | Ozkan et al. |
| 6,047,317 A | * | 4/2000 | Bisdikian et al. .............. 725/142 |

(Continued)

FOREIGN PATENT DOCUMENTS

WO    WO 0005890 A1 *   2/2000

*Primary Examiner* — Scott Beliveau
*Assistant Examiner* — Alexander Q Huerta
(74) *Attorney, Agent, or Firm* — Merchant & Gould

(57) ABSTRACT

Techniques for transmitting multiple "slices" of information for a particular location of a user interface, which can be used to present more information to a viewer for a limited-size viewing area. Multiple slices can be associated with a particular slice location of a user interface. In a first slice delivery and presentation scheme, multiple slices for a particular location of an interactive program guide (IPG) page are transmitted from the head-end at different times, and the slices can be appropriately time stamped for presentation at the designated times. In a second scheme, multiple slices are concurrently transmitted for a particular location of an IPG page, and one of the multiple slices can be selected for processing and display. In a third scheme, one slice is transmitted for each slice location, and additional slices can be transmitted for a particular location upon receiving a request from the terminal.

18 Claims, 12 Drawing Sheets

U.S. PATENT DOCUMENTS

| | | | | |
|---|---|---|---|---|
| 6,057,890 A | * | 5/2000 | Virden et al. | 348/563 |
| 6,064,378 A | | 5/2000 | Chaney et al. | |
| 6,147,714 A | * | 11/2000 | Terasawa et al. | 348/564 |
| 6,266,813 B1 | * | 7/2001 | Ihara | 725/36 |
| 6,380,984 B1 | | 4/2002 | Inoue et al. | |
| 6,415,437 B1 | * | 7/2002 | Ludvig et al. | 725/41 |
| 6,481,012 B1 | | 11/2002 | Gordon et al. | |
| 6,504,576 B2 | | 1/2003 | Kato | |
| 6,519,009 B1 | * | 2/2003 | Hanaya et al. | 348/564 |
| 6,614,843 B1 | | 9/2003 | Gordon et al. | |
| 6,621,870 B1 | | 9/2003 | Gordon et al. | |
| 6,651,252 B1 | | 11/2003 | Gordon et al. | |
| 6,675,385 B1 | | 1/2004 | Wang | |
| 6,968,566 B1 | | 11/2005 | Entwistle | |
| 8,347,337 B2 | * | 1/2013 | Barton et al. | 725/58 |
| 2001/0056577 A1 | | 12/2001 | Gordon et al. | |
| 2002/0066101 A1 | | 5/2002 | Gordon et al. | |
| 2002/0078440 A1 | | 6/2002 | Feinberg et al. | |
| 2002/0078449 A1 | | 6/2002 | Gordon et al. | |
| 2003/0012555 A1 | * | 1/2003 | Yuen et al. | 386/83 |
| 2003/0028879 A1 | | 2/2003 | Gordon et al. | |
| 2003/0208759 A1 | | 11/2003 | Gordon et al. | |
| 2003/0217360 A1 | | 11/2003 | Gordon et al. | |
| 2004/0172661 A1 | * | 9/2004 | Yagawa et al. | 725/131 |
| 2007/0132784 A1 | * | 6/2007 | Easwar et al. | 345/629 |

* cited by examiner

METHOD AND APPARATUS FOR DELIVERING AND DISPLAYING INFORMATION FOR A MULTI-LAYER USER INTERFACE

CROSS-REFERENCES TO RELATED APPLICATIONS

This application is a divisional of pending U.S. patent application Ser. No. 09/729,660, filed Dec. 4, 2000, now abandoned entitled "METHOD AND APPARATUS FOR DELIVERING AND DISPLAYING INFORMATION FOR A MULTI-LAYER USER INTERFACE," which application claims the benefit of U.S. Provisional Application Ser. No. 60/253,417, entitled "METHOD AND APPARATUS FOR INTERACTIVE PROGRAM GUIDE AND ADVERTISING SYSTEM," filed Nov. 27, 2000, each of which is incorporated herein by reference in its entirety.

BACKGROUND OF THE INVENTION

The present invention relates to communication systems in general. More specifically, the invention relates to techniques to efficiently deliver interactive program guide (IPG) and other multimedia information in a server-centric system.

Over the past few years, the television industry has seen a transformation in a variety of techniques by which programming is distributed to consumers. Cable television systems are doubling or even tripling system bandwidth with the migration to hybrid fiber coax (HFC) cable plant. Direct broadcast satellite (DBS) systems have also emerged as a viable alternative to customers unwilling to subscribe to local cable systems. A variety of other approaches have also been attempted, which focus primarily on high bandwidth digital technologies, intelligent two-way set top terminals, or other methods to try to offer service differentiated from standard cable and over-the-air broadcast systems.

With this increase in bandwidth, the number of programming choices has also increased. Leveraging off the availability of more intelligent set top terminals (STTs), several companies have developed elaborate systems for providing an interactive listing of a vast array of channel offerings, expanded textual information about individual programs, and the ability to look forward as much as several weeks in advance to plan television viewing.

Unfortunately, the existing program guides have several drawbacks. First, these guides tend to require a significant amount of memory at the set top terminal. Second, the terminals may be very slow to acquire the current database of programming information when they are turned on for the first time or are subsequently restarted (e.g., a large database may be downloaded to a terminal using only a vertical blanking interval (VBI) data insertion technique). Such slow database acquisition may disadvantageously result in out of date information or, in the case of services such as pay-per-view (PPV) or video-on-demand (VOD), limited scheduling flexibility for the information provider. Third, the user interface of existing program guides do not usually look like a typical television control interface; rather the user interface looks like a 1980's style computer display (i.e., having blocky, ill-formed text and/or graphics).

Therefore, efficient and effective techniques to deliver interactive program guide and other multimedia information to a large number of viewers, and which that ameliorate the above-described problems, are highly desirable.

SUMMARY OF THE INVENTION

The present invention provides techniques for transmitting multiple "slices" of information for a particular location of a user interface. These techniques can be used to present more information to a viewer on a limited-size viewing area, and are well suited for interactive program guide (IPG) commonly used for television and broadcast distribution systems. The techniques described herein may also be advantageously used for other applications and other guides such as, for example, dining guide, local shopping, news, and others.

In accordance with an aspect of the invention, multiple slices can be associated with a particular slice location of the IPG page. These multiple slices can be used to present more information (i.e., content) at the slice location. Various schemes can be used to deliver and present the multiple slices in an intelligible manner while reducing the amount of clutter.

In a first slice delivery and presentation scheme, multiple slices for a particular location of an IPG page are transmitted from the head-end at different times. For example, the multiple slices can be transmitted at different GOP times, and the slices can be appropriately time stamped for presentation at the desired GOP times. In a second scheme, multiple slices are concurrently transmitted for a particular location of an IPG page. In this scheme, a terminal can receive the transmitted slices, select one of the multiple slices for processing, and process and display the selected slice. In a third scheme, one slice is transmitted for each slice location, and additional slices can be transmitted for a particular location by the head-end upon receiving a request from the terminal.

An embodiment of the invention provides a method for delivering information for a user interface that includes a number of regions. In accordance with the method, which is generally performed at a head-end of an information distribution system, a number of slice locations for a first (e.g., guide) region of the user interface are defined, with each slice location corresponding to a respective area and location in the guide region. A number of (e.g., guide) slices are associated with each of at least one slice location in the guide region. One or more guide slices are encoded for each slice location in the guide region and transmitted.

A number of sets of guide slices can be transmitted for the slice locations in the guide region, for example, in a time division multiplexed manner in which one set of guide slices is transmitted for each group of pictures (GOP). Alternatively, one set of guide slices may be continually transmitted and additional sets may be transmitted as requested. The transmitted slices can be time-stamped for presentation at the designated times.

Another embodiment of the invention provides a method for presenting a user interface that includes a number of regions. In accordance with the method, which is generally performed at a terminal, a bitstream comprising packets for a number of slices for a first (e.g., guide) region of the user interface is received. Each slice is designated for presentation at a particular slice location of the guide region, and multiple slices are transmitted for each of at least one slice location of the guide region. Packets for a set of slices for the guide region are retrieved from the bitstream and decoded to form the guide region of the user interface.

A number of sets of slices may be received for the guide region. In this case, the sets of slices may be decoded and presented at times designated by a header associated with the slices. The sets of slices can be presented in a time division multiplexed manner, or upon receiving a directive to update the slices in the guide region.

The invention further provides other methods and system elements (i.e., terminal and server) that implement various aspects, embodiments, and features of the invention, as described in further detail below.

The foregoing, together with other aspects of this invention, will become more apparent when referring to the following specification, claims, and accompanying drawings.

BRIEF DESCRIPTION OF THE DRAWINGS

The teachings of the invention can be readily understood by considering the following detailed description in conjunction with the accompanying drawings.

To facilitate understanding, identical reference numerals have been used, where possible, to designate identical elements that are common within a figure.

DESCRIPTION OF THE SPECIFIC EMBODIMENTS

A. System

Figure 1:
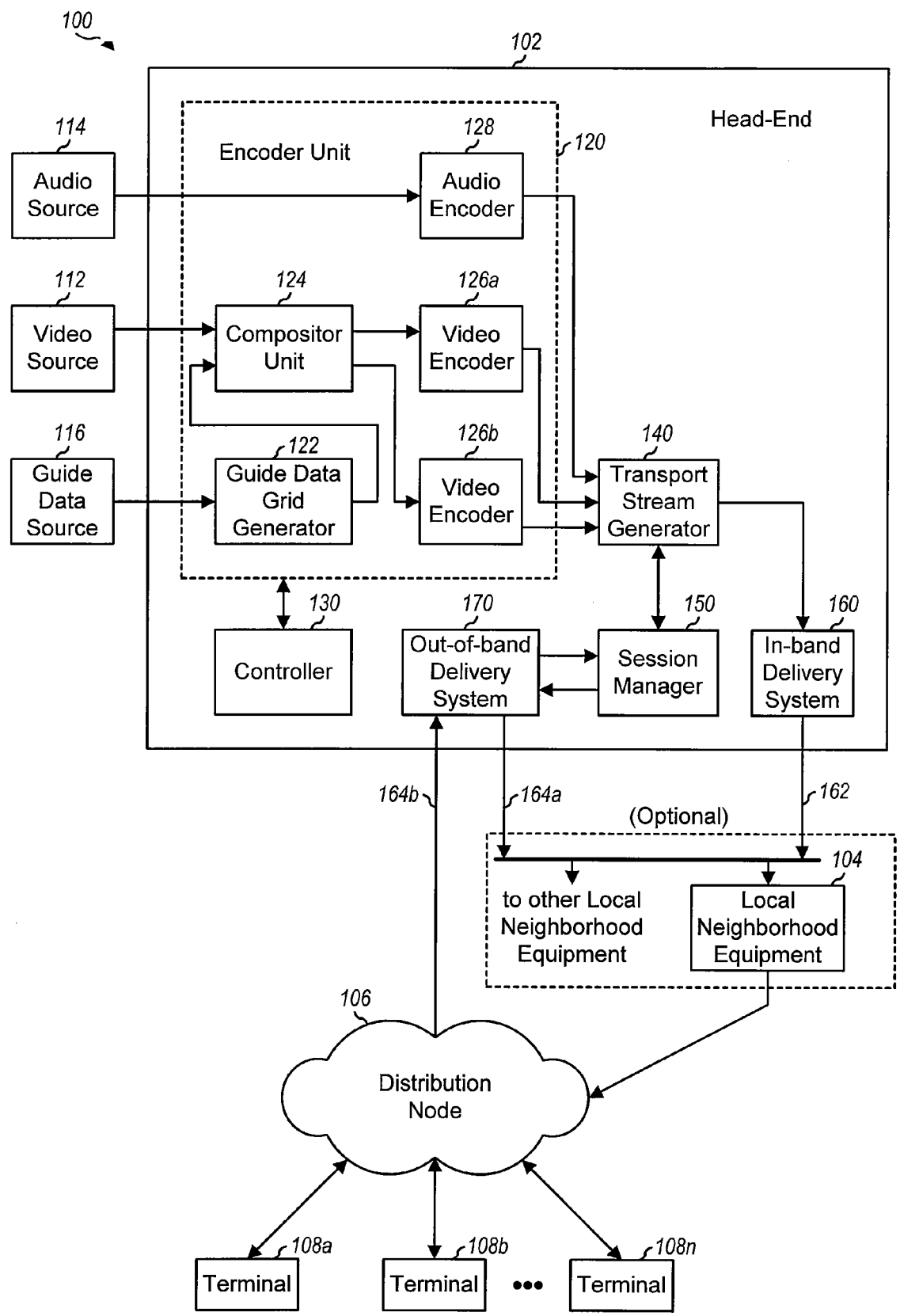
FIG. 1 is a block diagram of an embodiment of an information distribution system that can be used to provide interactive program guide (IPG) and is capable of implementing various aspects of the invention.

FIG. 1 is a block diagram of an embodiment of an information distribution system 100 that can be used to provide interactive program guide (IPG) and is capable of implementing various aspects of the invention. Distribution system 100 includes a head-end 102, (optional) local neighborhood equipment (LNE) 104, one or more distribution nodes 106 (e.g., a hybrid fiber-coax network), and a number of terminals 108 (e.g., set top terminals). Each LNE 104 may serve one or more distribution nodes 106, and each distribution node 106 is typically associated with a respective neighborhood that includes a number of terminals 108.

Head-end 102 produces a number of digital streams that contain encoded information in (e.g., MPEG-2) compressed format. These digital streams are then modulated using a modulation technique that is compatible with a communication channel 162 that couples head-end 102 to LNE 104 and/or distribution node 106. LNE 104 is typically located away from head-end 102. LNE 104 selects data for viewers in the LNE's neighborhood and re-modulates the selected data into a form suitable for transmission to the associated distribution node(s) 106. Although system 100 is depicted as having head-end 102 and LNE 104 as separate elements, the functions of LNE 104 may be incorporated into head-end 102. Also, the elements of system 100 can be physically located anywhere, and need not be near each other.

In distribution system 100, program streams may be continually transmitted from the head-end to the terminals (i.e., broadcast) or may be addressed to particular terminals that requested the information via an interactive menu (referred to herein as "demand-cast"). An interactive menu structure suitable for requesting video-on-demand (VOD) is disclosed in commonly assigned U.S. patent application Ser. No. 09/533, 006, entitled "METHOD AND APPARATUS FOR PROVIDING A MENU STRUCTURE FOR AN INTERACTIVE INFORMATION DISTRIBUTION SYSTEM," and incorporated herein by reference. Another example of an interactive menu suitable for requesting multimedia services is an interactive program guide disclosed in commonly assigned U.S. patent application Ser. No. 09/293,526, entitled "DATA STRUCTURE AND METHODS FOR PROVIDING AN INTERACTIVE PROGRAM GUIDE," filed Apr. 15, 1999, and incorporated herein by reference.

Figure 2A:
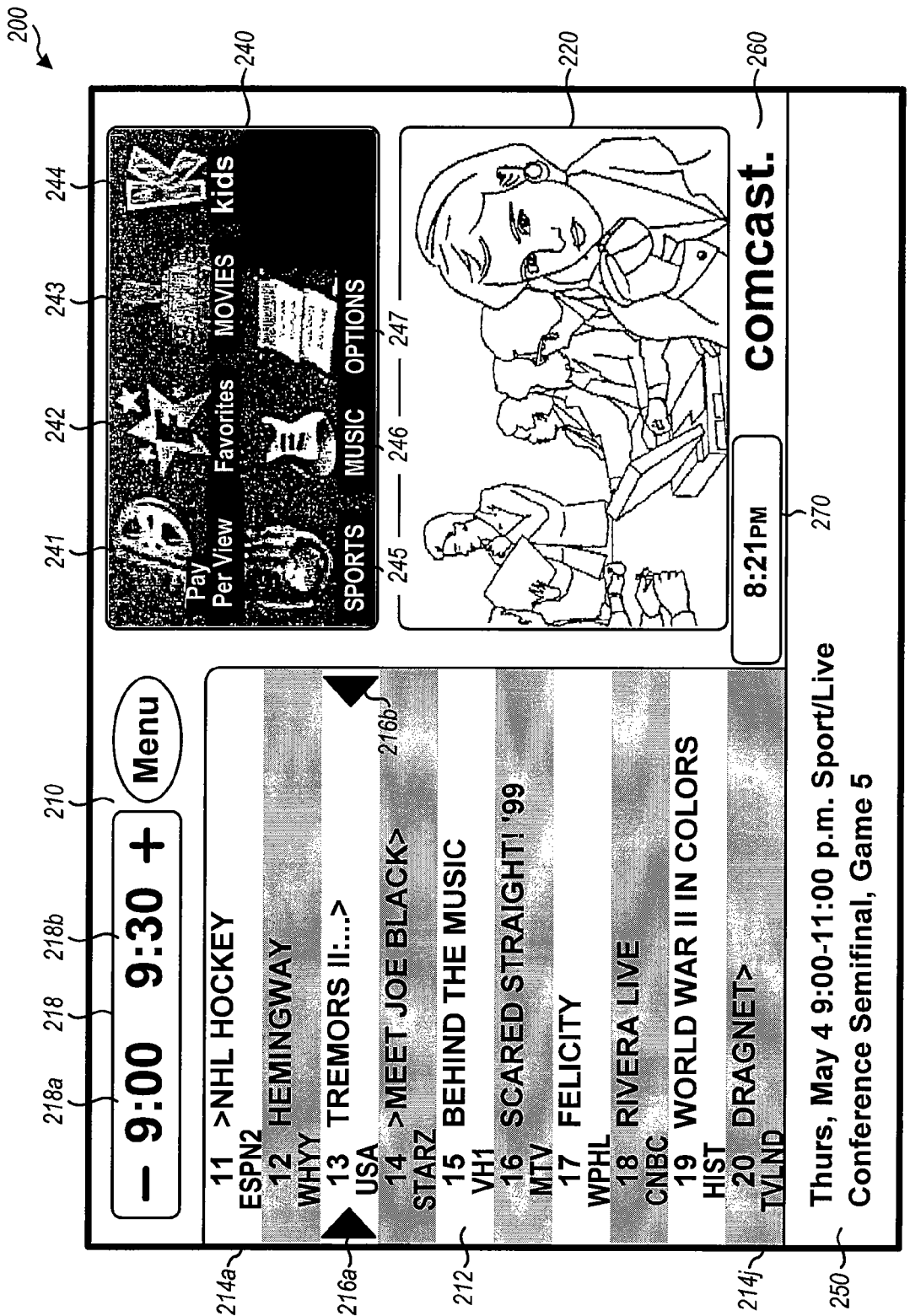
FIG. 2A is a diagram of a specific design of an IPG page used to present a program listing and other information to viewers.

To assist a viewer to select programming, head-end 102 produces information that can be assembled to create an "IPG page" such as that shown in FIG. 2A. Head-end 102 produces the components of the IPG page as bitstreams that are compressed prior to transmission. Terminals 108 thereafter receive and demodulate the transmission from head-end 102 and decode the compressed bitstreams to retrieve the IPG pages.

Within distribution system 100, a video source 112 supplies one or more video sequences for a video portion of the IPG pages (also referred to herein as "barker" videos), an audio source 114 supplies one or more audio signals associated with the video sequences, and a guide data source 116 provides program guide data for a guide portion of the IPG pages. The guide data is typically stored and provided in a particular (e.g., text) format, with each guide entry describing a particular program by its title, presentation time, presentation date, descriptive information, channel, and program source. The video sequences, audio signals, and program guide data are provided to an encoder unit 120 within head-end 102.

Encoder unit 120 (which is described in further detail below) compresses the received video sequences into one or more elementary streams, the audio signals into one or more elementary streams, and the guide videos produced from the guide data into one or more elementary streams. The elementary streams can be produced using a number of encoding techniques such as, for example, "picture-based" encoding, "slice-based" encoding, "temporal slice persistence" (TSP) encoding, "strobecast", as well as other types of encoding, or a combination thereof.

Picture-based encoding is described in detail in U.S. patent application Ser. No. 09/384,394, entitled "METHOD AND APPARATUS FOR COMPRESSING VIDEO SEQUENCES," filed Aug. 27, 1999. Slice-based encoding is described in detail in U.S. patent application Ser. No. 09/428, 066, entitled "METHOD AND APPARATUS FOR TRANSMITTING VIDEO AND GRAPHICS IN COMPRESSED FORM," filed Oct. 27, 1999. Temporal slice persistence encoding is described in detail in U.S. patent application Ser. No. 09/686,739, entitled "TEMPORAL SLICE PERSISTENCE METHOD AND APPARATUS FOR DELIVERY OF INTERACTIVE PROGRAM GUIDE," filed Oct. 10, 2000. Strobecast encoding and delivery is described in detail in U.S. patent application Ser. No. 09/687,662, entitled "EFFICIENT DELIVERY OF INTERACTIVE PROGRAM GUIDE USING DEMAND-CAST," filed Oct. 12, 2000. These applications are assigned to the assignee of the invention and incorporated herein by reference.

In the specific embodiment shown in FIG. 1, encoder unit 120 includes a guide data grid generator 122, a compositor unit 124, video encoders 126a and 126b, and an audio encoder 128. Additional video and/or audio encoders may also be included within encoder unit 120, depending on the particular head-end design. Guide data grid generator 122 receives and formats the guide data into a "guide grid", e.g., guide grid region 212 in FIG. 2A.

Figure 2B:
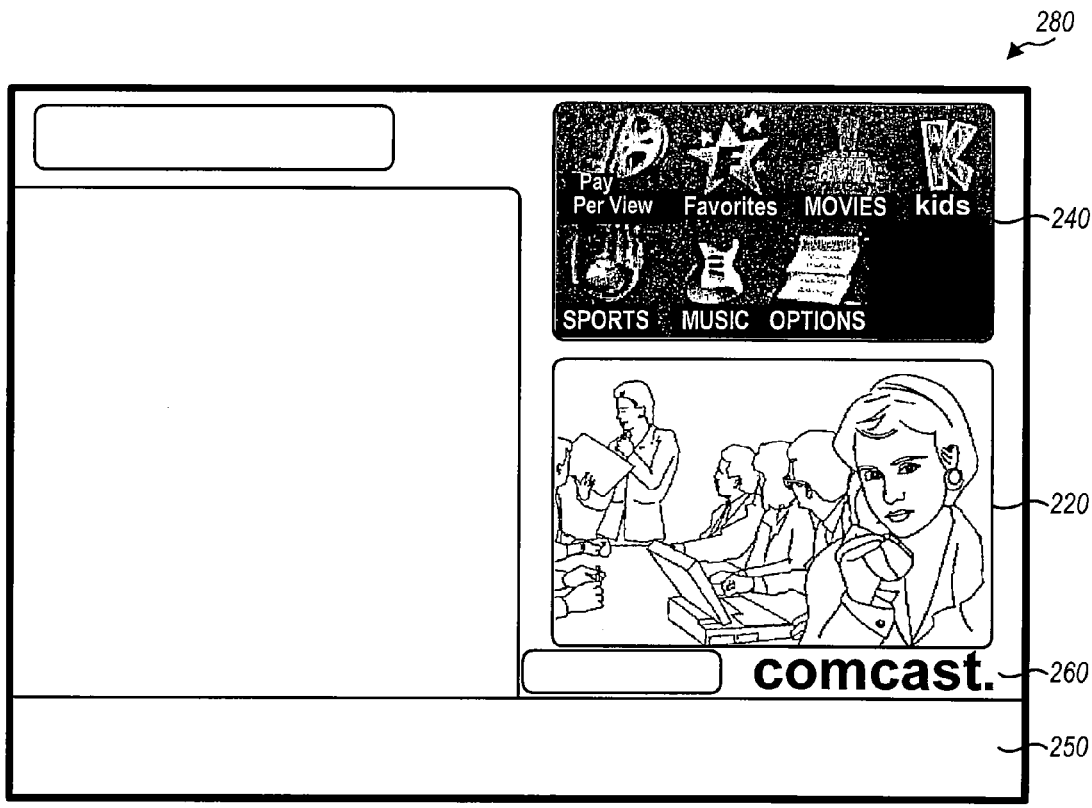
FIGS. 2B and 2C are diagrams of an embodiment of a background video and a guide video, respectively, for the IPG page shown in FIG. 2A.
Figure 2C:
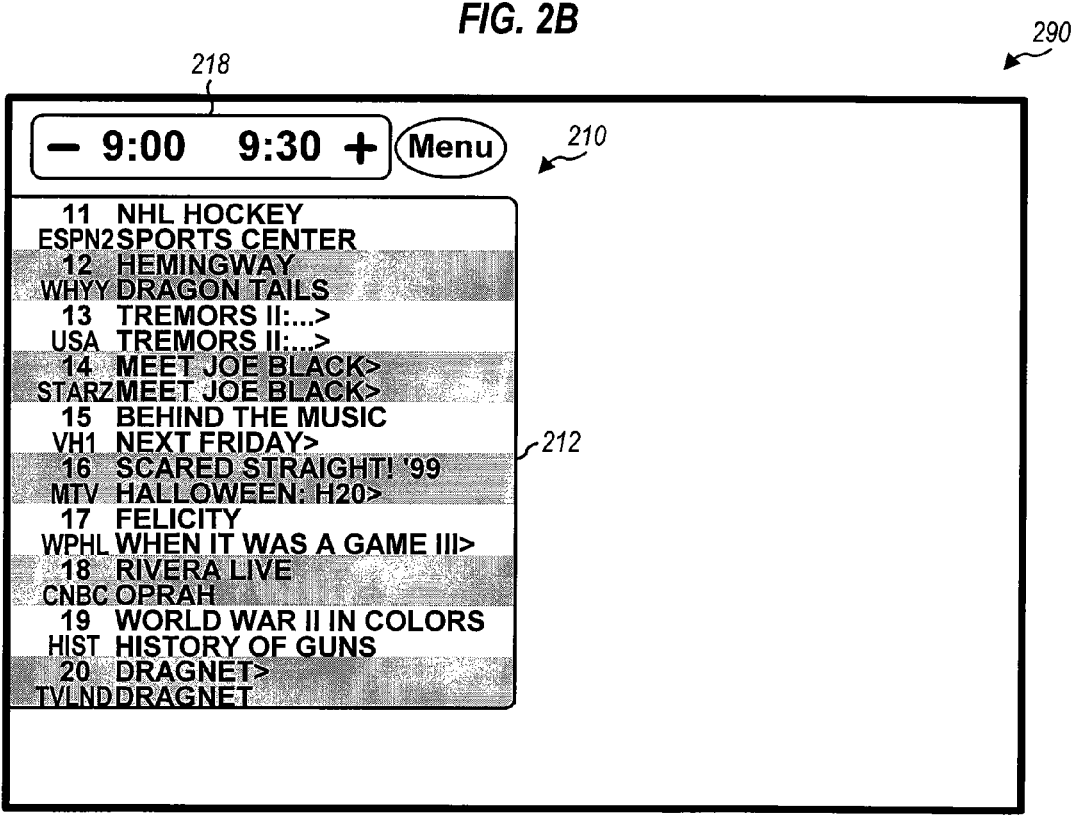

Compositor unit 124 receives and combines the guide grid from grid generator 122 and a video sequence from video source 112, and may further insert advertising video, advertiser or service provider logos, still graphics, animation, other information, or a combination thereof. In an embodiment, compositor unit 124 provides a background video (e.g., as shown in FIG. 2B) to a first video encoder 126a and a guide video (e.g., as shown in FIG. 2C) to a second video encoder 126b. For picture-based encoding, compositor unit 124 provides a composed video (e.g., as shown in FIG. 2A) to one video encoder. A number of encoders can be used to encode in parallel a number of composed videos for a number of IPG pages, with each IPG page including different guide content.

In an embodiment, video encoder 126a is a real-time (e.g., MPEG-2) encoder that encodes the background video using a particular encoding technique, and provides one or more (e.g., MPEG-2 compliant) bitstreams for the background portion of the IPG page. In an embodiment, video encoder 126b is a (e.g., software-based) encoder that encodes the guide video using a particular encoding technique, and provides one or more bitstreams that collectively represent all or a portion of the guide grid. Each video encoder 126 is designed to efficiently and effectively encode the respective input video, and may be operated in accordance with slice-based, picture-based, temporal slice persistence, or some other encoding technique. Audio encoder 128 (e.g., an AC-3 encoder) receives and encodes the audio signals to form a bitstream for the audio signals. The video and audio encoders provide a number of elementary streams containing (e.g., picture-based or slice-based) encoded video and audio information.

For some applications such as picture-in-picture (PIP) or picture-in-application (PIA), compositor unit 124 may receive a number of video sequences and form a composed video having included therein the video sequences in scaled form (i.e., reduced in size). For example, nine video sequences may be compressed and arranged into a 3×3 grid. Video encoder 126a then receives and (e.g., slice-based) encodes the composed video and produces a number of elementary streams, one stream for each video sequence. Each video sequence can thereafter be individually transmitted from the head-end and flexibly recombined with other (e.g., guide) data and/or video at the terminal (e.g., to implement PIP or PIA). PIP and PIA are described in further detail in U.S. patent application Ser. No. 09/635,508, entitled "METHOD AND APPARATUS FOR TRANSITIONING BETWEEN INTERACTIVE PROGRAM GUIDE (IPG) PAGES," filed Aug. 9, 2000, assigned to the assignee of the invention and incorporated herein by reference.

A controller 130 couples to encoder unit 120 and manages the overall encoding process such that the video encoding process is temporally and spatially synchronized with the grid encoding process. For slice-based encoding, this synchronization can be achieved by defining the slice start and stop (macroblock) locations for each slice and managing the encoding process based on the defined slices. Slices may be defined, for example, according to the objects in the IPG page layout.

The encoding process generates a group of pictures (GOP) structure having "intra-coded" (I) pictures and "predicted" (P and B) pictures. For slice-based encoding, the I pictures include intra-coded slices and the P and B pictures include predictive-coded slices. In an embodiment, the intra-coded slices are separated from the predictive-coded slices and transmitted from the head-end via separate packet identifiers (PIDs). Although not shown in FIG. 1, the coded slices may be stored in a storage unit. The individual slices can thereafter be retrieved from the storage unit as required for transmission from the head-end.

A transport stream generator (TSG) 140 receives and assembles the elementary streams from the video and audio encoders into one or more transport streams. Transport stream generator 140 further manages each transport stream and communicates with a session manager 150 to form and/or tear down transport streams. In an embodiment, each transport stream is an MPEG-compliant transport stream. In this case, transport stream generator 140 may send program tables to terminals 108 in a private section of the MPEG transport stream. Such table may include a list of available streams along with the address of the source transport stream generator and other information to identify the particular transport stream to which the table belongs.

Session manager 150 manages the delivery of IPG pages to terminals 108 located on one or more distribution nodes 106. In an embodiment, each distribution node 106 is served by a respective set of one or more transport streams generated by a transport stream generator assigned to that node. The transport streams for each distribution node include broadcast streams (e.g., for IPG pages continually sent from the head-end) and demand-cast streams (e.g., for IPG pages sent from the head-end in response to requests from the terminals). For some implementations, session manager 150 may monitor the demand-cast streams and usage by terminals 108 and direct the appropriate transport stream generator to generate or tear down demand-cast streams.

An in-band delivery system 160 (e.g., a cable modem) receives and modulates the transport streams from transport stream generator 140 using a modulation format suitable for transmission over communication channel 162, which may be, for example, a fiber optic channel that carries high-speed data from the head-end to a number of LNE and/or distribution nodes. Each LNE selects the programming (e.g., the IPG page components) that is applicable to its neighborhood and re-modulates the selected data into a format suitable for transmission over the associated distribution node(s).

Although not shown in FIG. 1 for simplicity, LNE 104 may include a cable modem, a slice combiner, a multiplexer, and a modulator. The cable modem demodulates a signal received from the head-end and extracts the coded video, guide, data, and audio information from the received signal. The coded information is typically included in one or more transport streams. The slice combiner may recombine the received video slices with the guide slices in an order such that a decoder at the terminals can easily decode the IPG without further slice re-organization. The multiplexer assigns PIDs for the resultant combined slices and forms one or more (e.g., MPEG-compliant) transport streams. The modulator then transmits the transport stream(s) to the distribution node(s).

LNE 104 can be programmed to extract specific information from the signal transmitted by the head-end. As such, the LNE can extract video and guide slices that are targeted to the viewers served by the LNE. For example, the LNE can extract specific channels for representation in the guide grid that can be made available to the viewers served by that LNE. In such case, unavailable channels to a particular neighborhood would not be depicted in a viewer's IPG. The IPG may also include targeted advertising, e-commerce, program notes, and others. To support such features, each LNE may recombine different guide slices with different video slices to produce IPG pages that are prepared specifically for the viewers served by that particular LNE. Other LNEs may select different IPG component information that is relevant for their associated viewers. A detailed description of LNE 104 is described in the aforementioned U.S. patent application Ser. No. 09/635,508.

For a server-centric distribution system, the program guide resides at the head-end and a two-way communication system, via a back channel 164, is utilized to support communication with the terminals for delivery of the program guide. Back-channel 164 can be used by the terminals to send requests and other messages to the head-end, and may also be used by the head-end to send messages and certain types of data to the terminals. An out-of-band delivery system 170 facilitates the exchange of data over the back channel and forwards terminal requests to session manager 150.

Other elements within head-end 102 may also interface with out-of-band delivery system 170 to send information to terminal 108 via the out-of-band network. Fort example, a spotlight server that produces a spotlight user interface (described below) may interface with out-of-band delivery system 170 directly to send spotlight data to terminals 108. Off the shelf equipment including network controllers, modulators, and demodulators such as those provided by General Instrument Corporation can be used to implement out-of-band delivery system 170.

Distribution system 100 is described in further detail in the aforementioned U.S. patent application Ser. Nos. 09/687,662 and 09/686,739. One specific implementation of head-end 102 is known as the DIVA™ System provided by DIVA Systems Corporation.

B. Interactive Program Guide

A unique way of providing programming schedule and listing to viewers is a server-centric approach. In this approach, the complete program guide information spanning a particular time period (e.g., two weeks of programming) is generated at a head-end and sent to the terminals in a display-ready compressed video format.

FIG. 2A is a diagram of a specific design of an IPG page 200 used to present a program listing and other information to viewers. In this design, IPG page 200 includes a guide region 210, a video region 220, an icon region 240, a program description region 250, a logo region 260, and a time-of-day region 270. Other designs for the IPG page with different layouts, configurations, and combinations and arrangements of regions and objects can be contemplated and are within the scope of the invention.

In an embodiment, guide region 210 includes a guide grid region 212 and a time slot region 218. Time slot region 218 includes a first time slot object 218a and a second time slot object 218b that indicate the (e.g., half-hour) time slots for which program guide is being provided on the IPG page. Guide grid region 212 is used to display program listing for a group of channels. In the design shown in FIG. 2A, the program listing shows the available programming in two half-hour time slots. Guide grid region 212 includes a number of channel objects 214a through 214j used to display program information for the group of channels. A pair of channel indicators 216a and 216b within guide grid region 212 identifies the current cursor location.

Program description region 250 is used to present descriptive information relating to a particular program selected from the program listing, or may be used to present other information. Video region 220 may be used to display images, videos, text, or a combination thereof, which may be used for advertisements, previews, or other purposes. In the design shown in FIG. 2A, video region 220 displays a barker video. Logo region 260 may include a logo of a service operator or other entity, and may be optionally displayed. Time-of-day region 270 may be configured by the user and may also be optionally displayed.

Icon region 240 is used to display various icons. Each icon can represent a filter or a link to either another IPG page or a particular interface. Each filter selects a particular type of programming to be included in the program listing shown in guide region 210. For example, a "Pay Per View" (PPV) icon 241 may be a filter that selects only PPV programming to be included in the program listing. A "Favorites" icon 242 may be a filter that selects only channels designated by the viewer to be among his or her favorites. A "Movies" icon 243 may be a filter that selects only movies or movie channels. A "Kids" icon 244 may be a filter that selects only channels for children or programming appropriate or produced for viewing by children. A "Sports" icon 245 may be a filter that selects only sports channels or sports-related programming. A "Music" icon 246 may be a link to a music interface. And an "Options" icon 247 may be a link to a menu of IPG options that the viewer may select amongst. Such options may include (1) configuration and selection/deselection information of IPG related services, (2) custom information for deactivating some of the filters or accessing a custom condensed listing menus, and (3) other features and functionality.

FIG. 2B is a diagram of an embodiment of a background video 280 for IPG page 200. In this embodiment, background video 280 includes video region 220, icon region 240, program description region 250, and logo region 260. As noted above, background video 280 can be efficiently (slice-based) encoded by a video encoder. In other designs, background video 280 may include additional and/or different regions than that shown in FIG. 2B.

FIG. 2C is a diagram of an embodiment of a guide video 290 for IPG page 200. In this embodiment, guide video 290 includes guide region 210, which includes guide grid region 212 and time slot region 218. Guide video 290 can also be efficiently (slice-based) encoded by a video encoder. In other designs, guide video 290 may include additional and/or different regions than that shown in FIG. 2C.

As shown in FIG. 2C, two program titles are provided for each channel object 214 in guide grid region 212, with each title corresponding to a respective half-hour time slot. In an embodiment, a "mask or reveal" feature can be used to display (i.e., reveal) a desired program title and hide (i.e., mask) the other program title. For example, channel 12 includes the program titles "Hemingway" and "Dragon Tails". If the 9:00-9:30 time slot is selected (as shown in FIG. 2A), the program title "Hemingway" can be revealed and the other program title "Dragon Tails" can be masked from view. And if the 9:30-10:00 time slot is selected, the program title "Hemingway" can be masked and the other program title "Dragon Tails" can be revealed. The underlying video frame to be encoded can thus include various objects and items, some of which may be shown and others of which may be hidden. This mask or reveal technique can be used for any region of the IPG page.

The mask or reveal feature and the user interaction processing are described in the aforementioned U.S. patent application Ser. Nos. 09/293,526 and 09/533,006.

A program guide for a large number of channels for a long time period can be very extensive. For example, 480 IPG pages would be needed to provide program guide for two weeks of programming for 200 channels, if each IPG page includes a program listing for 10 channels in two half-hour time slots as shown in FIG. 2A. A large amount of system resources (e.g., bandwidth) would be needed to continually transmit the complete program guide.

In an embodiment, to conserve system resources, only a limited number of IPG pages are continually sent (broadcast) by the head-end, and remaining IPG pages may be sent as requested by viewers. The specific number of IPG pages to be broadcasted and their selection are dependent on the particular system implementation, and may be defined by a time depth and a program depth for the program guide. The time depth refers to the amount of time programming for a particular channel group is provided by the broadcast video PIDs. And the channel depth refers to the number of channels available through the program guide (in comparison to the total number of channels available in the system).

In an embodiment, a number of video PIDs can be used to send the program guide for the current and (possibly) near look-ahead time slots, one or more audio PIDs can be used to send an audio barker, and (optionally) one or more data PIDs (or other data transport method) can be used to send the program description data, overlay data, and/or other data. The elementary streams carrying the IPG are sent in one or more transport streams.

For the portion of the program guide that is broadcasted by the head-end, a viewer is able to quickly retrieve and display IPG pages formed from the broadcast streams whenever desired.

If the viewer desires a program listing or other contents that is not provided by the broadcast streams, then a demand-cast session may be initiated, for example, as described in the aforementioned U.S. patent application Ser. Nos. 09/635,508 and Ser. No. 09/686,739. For this demand-cast session, the terminal sends a message to the head-end, via the back channel, requesting the desired contents. The head-end processes the request, retrieves the desired contents from an appropriate source, generates a video stream for the desired contents and assigns it with another video PID (and related audio and data PIDs, if any), and incorporates the video stream into a transport stream. Preferably, the desired video stream is inserted into the transport stream currently being tuned/selected by the requesting terminal or sent in another transport stream. The head-end further informs the terminal which PID should be received and from which transport stream the demand-cast video stream should be demultiplexed. The terminal then retrieves the desired video PID from the transport stream.

C. Data Structures and Encoding Techniques

Figure 3A:
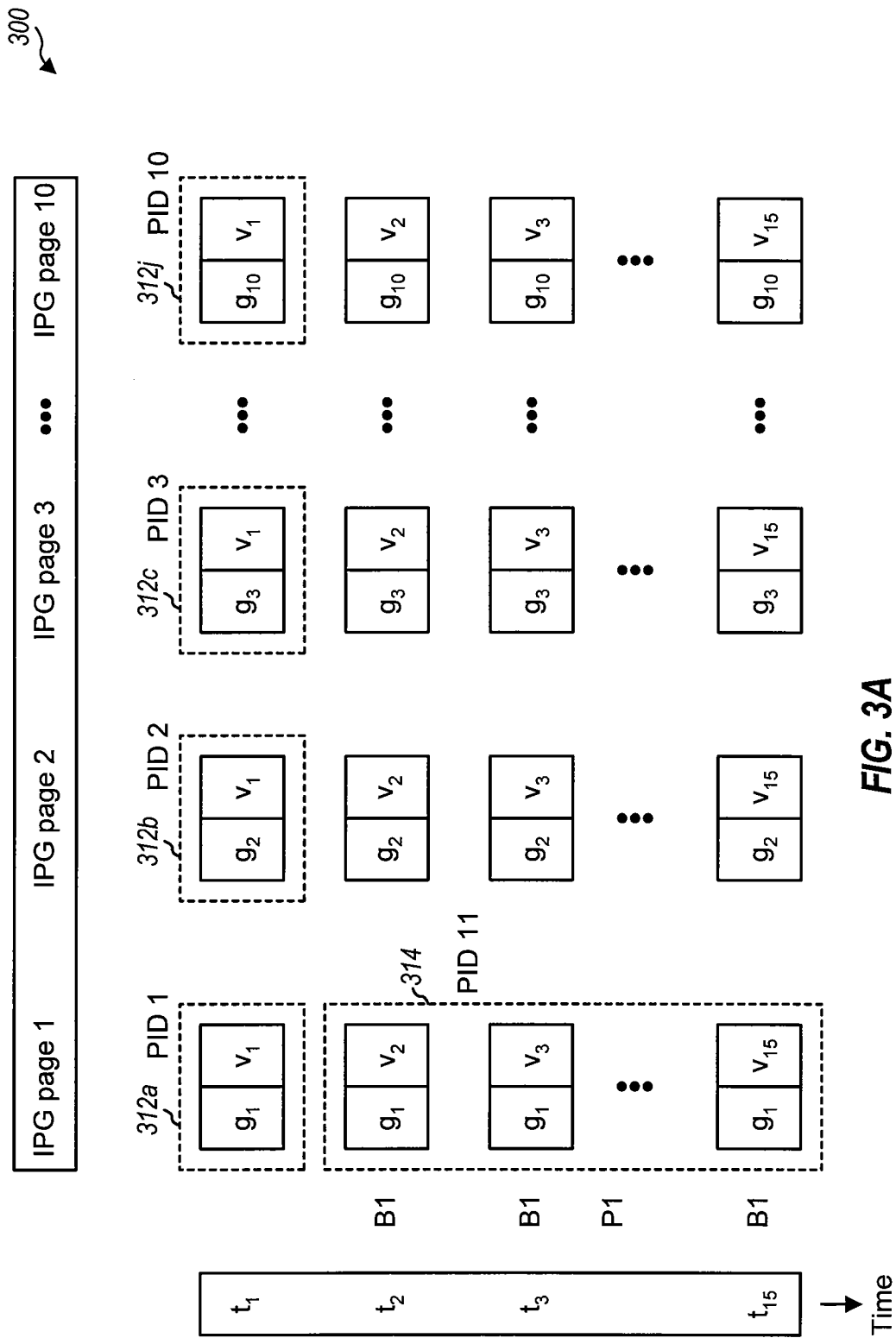
FIGS. 3A through 3C are diagrams of data structures (i.e., matrices) of program guide data for a group of IPG pages, and which may be used in conjunction with picture-based encoding, slice-based encoding, and temporal slice persistence encoding, respectively.

FIG. 3A is a diagram of a data structure 300 (i.e., a matrix) of program guide data for a group of IPG pages, and which may be used in conjunction with picture-based encoding. In this representation, the horizontal axis represents the video sequences for different IPG pages to be transmitted, and the vertical axis represents time indices for the video sequences. In this specific example, ten video sequences are generated and labeled as IPG pages 1 through 10. Each video sequence is composed of a time sequence of pictures. In this specific example, each group of 15 pictures for each video sequence forms a group of pictures (GOP) for that video sequence. Matrix 300 is illustratively shown to include ten GOPs for ten IPG pages, but can be designed to have any defined M×N dimension.

As shown in FIG. 3A, matrix 300 is a two-dimensional array of elements, with each element representing a picture (or frame). For simplicity, each element in matrix 300 is illustratively shown to include a guide portion and a video portion on the left and right halves of the picture, respectively. The element in the first column of the first row represents the guide portion ($g_1$) and video portion ($v_1$) of IPG page 1 at time index $t_1$, the element in the second column of the first row represents the guide portion ($g_2$) and video portion ($v_1$) of IPG page 2 at time index $t_1$, and so on. In the specific example shown FIG. 3A, the guide portion for each IPG page is different (i.e., $g_1, g_2, \ldots, g_{10}$) but the video portion (e.g., $v_1$) is common for all ten IPG pages.

Each of the ten video sequences in matrix 300 can be coded as a GOP. For example, the video sequence for IPG page 1 can be coded as a GOP comprised of the coded picture sequence: I1, B1, B1, P1, B1, B1, P1, B1, B1, P1, B1, B1, P1, B1, and B1, where I represents an intra-coded picture, P represents a uni-directionally predictive-coded picture, and B represents a bi-directionally predictive-coded picture.

In the example shown in FIG. 3A, matrix 300 includes a group of intra-coded pictures 312 and a group of predictive-coded pictures 314 that can be used to fully represent the ten IPG pages. In an embodiment, intra-coded picture group 312 includes ten intra-coded pictures at time index $t_1$ for the ten IPG pages. These intra-coded pictures can be assigned to PIDs 1 through 10, which may also be referred to as I-PIDs 1 through 10 to denote that these PIDs include intra-coded pictures. In an embodiment, predictive-coded picture group 314 includes 14 predictive-coded pictures of one of the IPG pages for time indices $t_2$ through $t_{15}$. Predictive-coded picture group 314 is also assigned a PID, and may also be referred to as the base-PID or PRED-PID to denote that this PID includes predictive-coded pictures. The base-PID may comprise the following picture sequence: B1, B1, P1, B1, B1, P1, B1, B1, P1, B1, B1, P1, B1, and B1.

For each IPG page, between time $t_1$ to $t_{15}$, the guide portion does not change and only the video portion changes. In each column, the 14 prediction error frames contain zero data for the guide portion and video prediction error for the video portion. Therefore, the content of the base-PID is the same for each IPG page and may be sent only once per group of IPG pages in the matrix for each GOP period.

If a viewer wants to view the guide data for a particular group of channels (i.e., a particular IPG page), a demultiplexer at the terminal selects the I-PID for the selected IPG page and recombines the selected I-PID with the base-PID to produce a recombined stream, which is then decoded by the video decoder. Picture-level recombination is described in further detail in the aforementioned U.S. patent application Ser. No. 09/686,739.

Figure 3B:
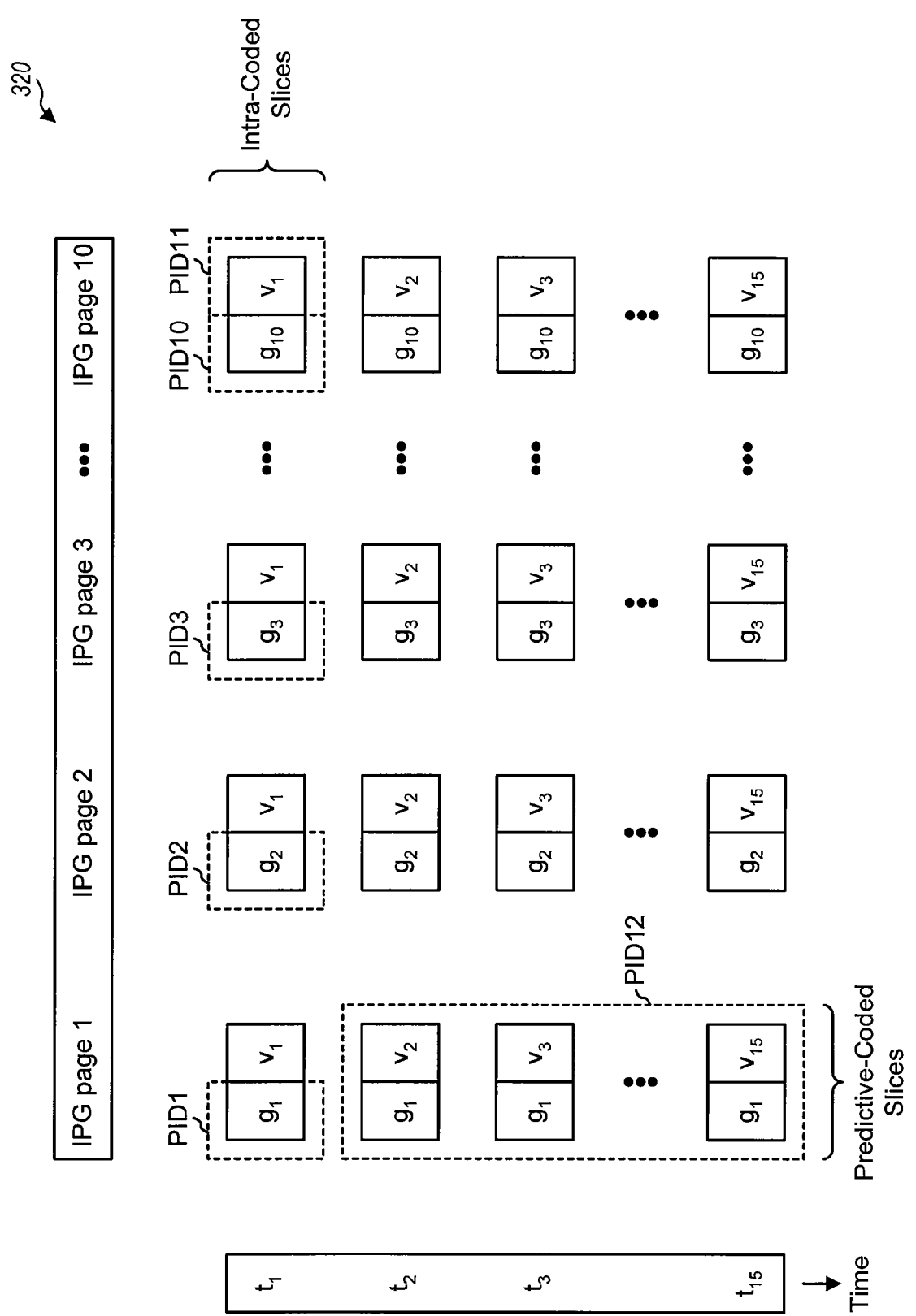

FIG. 3B depicts an embodiment of a data structure 320 that may be used in conjunction with slice-based encoding. In this example, ten IPG pages are available, with each page represented by a respective guide portion (g) and a common video portion (v). For example, IPG page 1 is represented as ($g_1/v_1$), IPG page 2 is represented as ($g_2/v_1$), and so on. In data structure 320, ten guide portions $g_1$ through $g_{10}$ are associated with the video portion ($v_1$). Slice-based encoding is described in the aforementioned U.S. patent application Ser. Nos. 09/686,739 and Ser. No. 09/635,508.

As shown in FIG. 3B, the coded slices for the guide and video portions of the IPG pages can be assigned to a number of PIDs. In FIG. 3B, only the content that is assigned a PID is delivered to the terminals. The intra-coded guide portions $g_1$ through $g_{10}$ are assigned to PID 1 through PID 10, respectively. One of the common intra-coded video portion $v_1$ (e.g., for IPG page 10) is assigned to PID 11. In this form, substantial bandwidth saving is achieved by delivering the intra-coded video portion $v_1$ only once. Finally, the predictive-coded pictures $g_1/v_2$ through $g_1/v_{15}$ are assigned to PID 12. Again, a substantial saving in bandwidth is achieved by transmitting only one group of fourteen predictive-coded pictures, $g_1/v_2$ through $g_1/v_{15}$. The PID assignment and decoding processes are described in the aforementioned U.S. patent application Ser. No. 09/686,739.

Figure 3C:
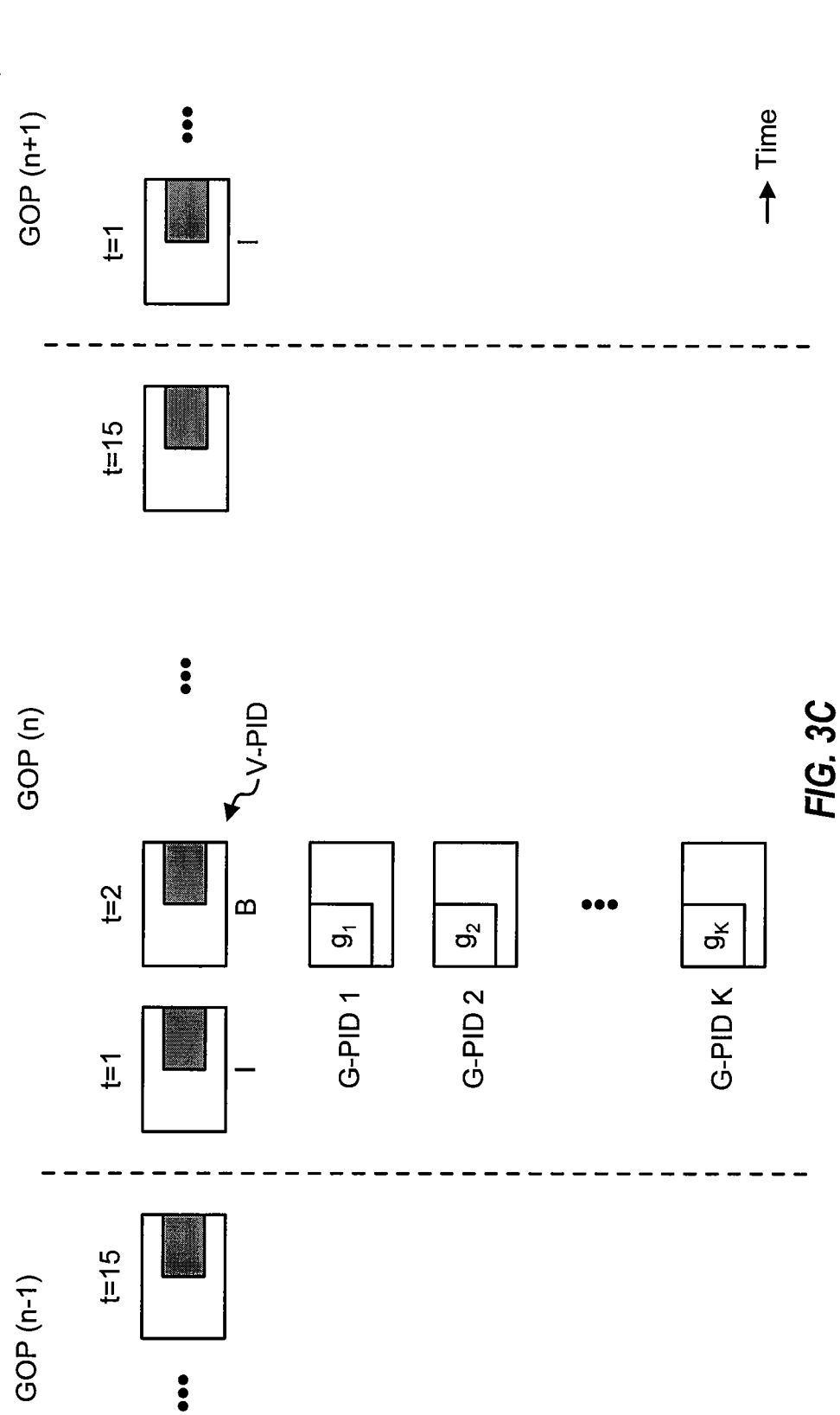

FIG. 3C is a diagram of a data structure 340 that can be used in conjunction with temporal slice persistence encoding. Data structure 340 is a matrix representation for program guide data for a number of IPG pages based on the partitioning of the IPG page shown in FIGS. 2B and 2C. As shown by the shaded portions in FIG. 3C, a video sequence is formed which contains only the video portion of the IPG page (i.e., the portion containing time-varying information). In an embodiment, the coded video sequence contains only slices that belong to the video region. The coded video sequence is assigned a particular PID (e.g., V-PID) and transmitted from the head-end.

For each IPG page, the guide portion (i.e., the portion containing the information specific to that IPG page) is sent in a separate picture frame. Since the guide portion does not change over time, only one picture for each GOP is coded and transmitted. The coded guide frame contains only the slices that belong to the guide portion of a frame. The slice-coded guide portion for each IPG page is assigned a respective PID (e.g., G-PID) and also transmitted from the head-end.

The presentation times of the guide frames and motion video frames are assigned in accordance with a "temporal slice persistence" fact. In an embodiment (not represented in FIG. 3C), the guide PIDs (i.e., G-PID 1, G-PID 2, and so on) are time stamped to be presented at the end of each GOP at t=15. At t=15, the last motion video frame in the GOP is dropped and the viewer-selected guide page is presented. To achieve this, the video decoder re-combines the selected guide G-PID (e.g., G-PID 1) and the video V-PID via one of the picture-based recombination methods described in the aforementioned U.S. patent application Ser. No. 09/686,739.

The selected guide page is decoded and displayed at t=15, with only the region that contains the guide portion slices being updated on the screen. From that time on, the guide portion of the screen is not updated (i.e., the guide slices temporally persist on the screen) until the viewer selects another guide page. This selection then updates the slices in the guide portion and rewrites the new guide portion on the screen. Similarly, the V-PID frames only change the video portion of the screen and do not update the guide portion, since these motion video frames do not include slices in the guide portion.

The embodiments disclosed with respect to FIG. 3C can be used for broadcast of IPG pages and can further be used for a demand-cast of IPG pages in response to viewer requests. For demand-cast, the head-end can time stamp the requested page to be processed and quickly displayed on the screen in a suitable time index within a GOP to reduce delays. The guide frames and motion video frames can be encoded, delivered, decoded, and displayed in various manners, as described in the aforementioned U.S. patent application Ser. No. 09/686, 739.

In another embodiment that is supported by FIG. 3C, the V-PID is encoded to include P and B pictures (e.g., a GOP of I-B-B-P-B-B-P-B-B-P-B-B-P-B-B), and any B picture in the V-PID can be dropped and replaced with a B-coded guide frame that includes "intra-coded" macroblocks. This can be achieved by adjusting the encoding threshold selection that decides whether a macroblock is better to be encoded as intra-coded or as predictive-coded. Any B-coded frame can be dropped and replaced since it is not used as a reference for prediction by any other pictures in a GOP. The guide page frames can be time stamped to be presented, for example, at t=2. Other embodiments for encoding and decoding the guide frames are described in the aforementioned U.S. patent application Ser. No. 09/686,739.

Figure 3D:
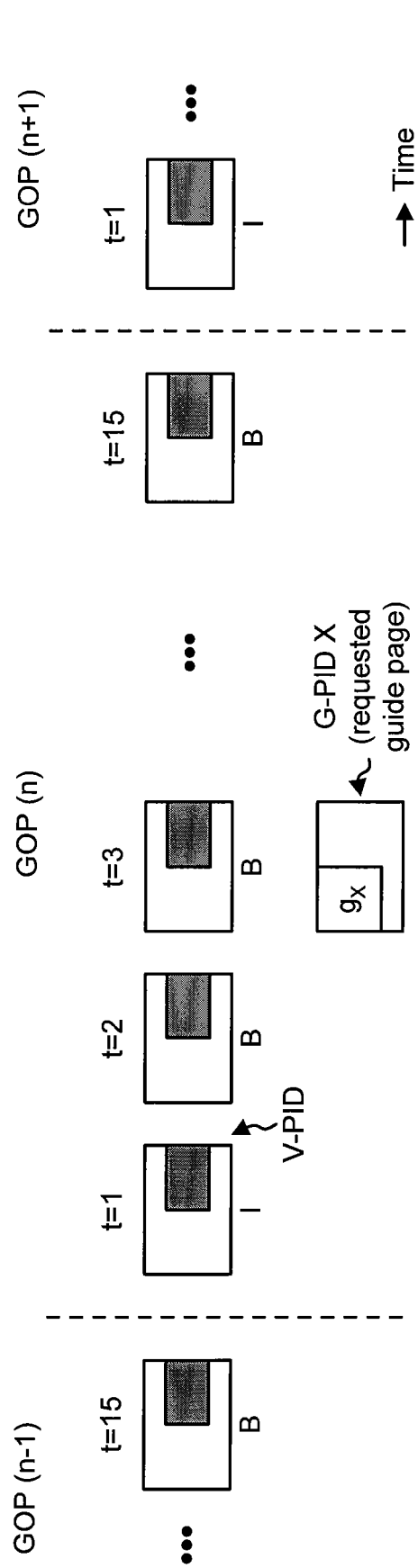
FIG. 3D is a diagram that shows an implementation of demand-cast with the use of temporal slice persistence technique.

FIG. 3D is a diagram that shows an implementation of demand-cast with the use of temporal slice persistence technique. In the example shown in FIG. 3D, a viewer request is received and processed by the head-end, and the requested guide PID is time stamped to be displayed at t=3. In this example, the V-PID is coded to include B frames (e.g., I-B-B-P-B-B-P . . . ), and the B frame at t=3 is dropped and replaced with a B-coded requested guide PID that includes intra-coded macroblocks. The B frame of the V-PID can be dropped at anytime in a GOP since it is not used as a reference for prediction by any other frame in the GOP.

The temporal slice persistence technique can be advantageously employed in a broadcast scenario whereby a large number of guide PIDs (in the order of hundreds) can be efficiently delivered. Since the guide PIDs do not carry full motion barker video, huge bandwidth savings can be achieved. The barker video can be sent as a separate video stream (e.g., V-PID or another PID). The temporal slice persistence technique can also be used to implement other combinations of coding and decoding of guide frames, fall motion video frames, and (possibly) other multimedia information in a GOP. The temporal slice persistence technique employs picture-based recombination techniques with slice-based sub-picture updating mechanisms, as described in the aforementioned U.S. patent application Ser. No. 09/686,739.

By exploiting known characteristics of the IPG pages and the temporal slice persistence technique, the transmission of redundant information can be minimized, for example, by employing efficient client-server communication and acknowledgement techniques. For example, the guide portion of a requested IPG page may be sent a limited number of times (e.g., once) in response to a viewer request for the page. This "strobecast" of IPG pages can greatly reduce the load for demand-cast, and may (possibly) be used for the delivery of other contents from the head-end. Strobecast techniques are described in detail in the aforementioned U.S. patent application Ser. No. 09/687,662.

D. Spotlight Window

Figure 4:
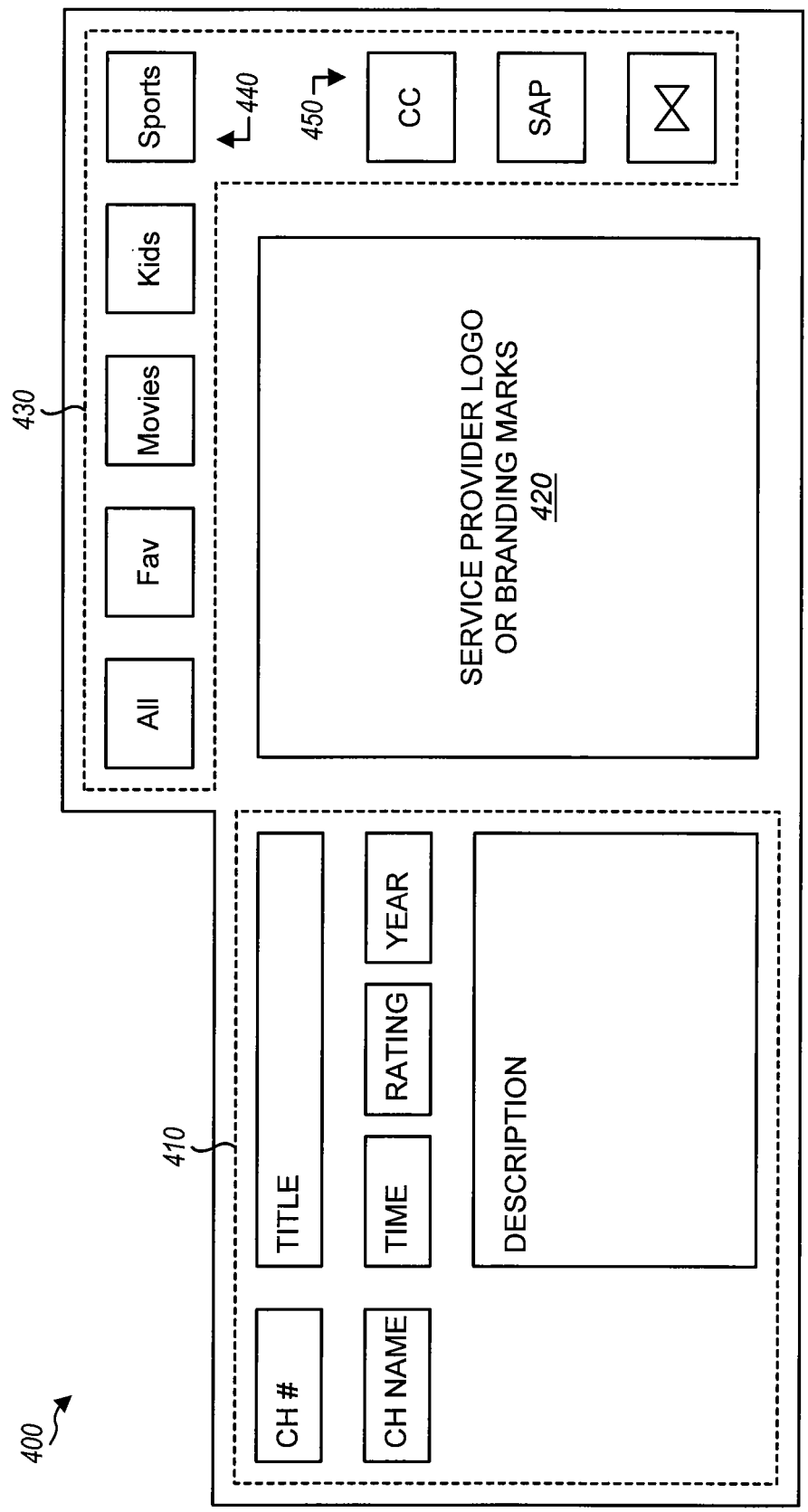
FIG. 4 is a diagram of a specific design of a channel information window (i.e., a spotlight window) that can also be used to efficiently provide IPG information.

FIG. 4 is a diagram of a specific design of a channel information window 400 (also referred to as a "spotlight window") that can also be used to efficiently provide IPG information. The spotlight window can be generated and overlay on top of a video display (e.g., whenever selected by a viewer). In this design, spotlight window 400 includes a specific portion 410, a local portion 420, and a common portion 430. Specific portion 410 includes information specific to a particular broadcast channel being described by spotlight window 400. Local portion 420 includes information targeted for delivery to the terminals within a particular locality. And common portion 430 includes features that are common for a number of spotlight windows (i.e., the background that is common for all broadcast channels and localities). FIG. 4 shows a specific design, and additional and/or different information, layouts, configurations, and arrangements may also be provided for each portion of spotlight window 400.

In the design shown in FIG. 4, specific portion 410 includes the channel number (e.g., "13"), the broadcast channel name (e.g., "USA"), the program title (e.g., "Tremors II: . . . "), the time period of the program (e.g., "9:00-11:00"), the program rating (e.g., "PG"), the copyright or release year (e.g., "1998"), and a brief description (e.g., "The creature from . . . ").

Local portion 420 includes, for example, a logo for the service provider or other branding related information. A different logo may be provided for each region served by a different service provider. Local portion 420 may also be partitioned into a number of smaller sub-portions, with each sub-portion being used to provide different information (e.g., targeted advertisements, locality specific announcements) and may further be associated with a particular localization level (e.g., an entire region, a neighborhood, or a set of terminals).

Common portion 430 includes a filter icon region 440 and an operational icon region 450. Filter icon region 440 includes a number of filter icons used to filter the programs to be displayed in the program guide, e.g., an "All" filter icon, a "Fav" or favorites filter icon, a "Movies" filter icon, a "Kids" filter icon, and a "Sports" filter icon. These filter icons can be designed to provide filtering functionality. Operational icon region 450 includes a close caption icon ("CC"), a secondary audio programming icon ("SAP"), and a stereo icon ("⋈ ").

In an embodiment, all or portions of the spotlight window are generated at the head-end and sent to the terminals. In this manner, the head-end has control over the particular arrangement (i.e., the layout and configuration) for the spotlight window and the information to be included in the various fields and portions of the spotlight window. Bitmap for all or portions the spotlight window may be encoded at the head-end, packetized, and sent to the terminals (e.g., via an out-of-band network). The spotlight data can be processed by a separate spotlight server that does not interfere with the operations of the session manager or the transport stream processor to send the spotlight data via the out-of-band network.

Techniques for generating, encoding, and delivering spotlight window is described in U.S. patent application Ser. No. 09/691,495, entitled "SYSTEM AND METHOD FOR LOCALIZED CHANNEL INFORMATION WINDOW," filed Oct. 18, 2000, assigned to the assignee of the invention and incorporated herein by reference.

E. Terminal

Figure 5:
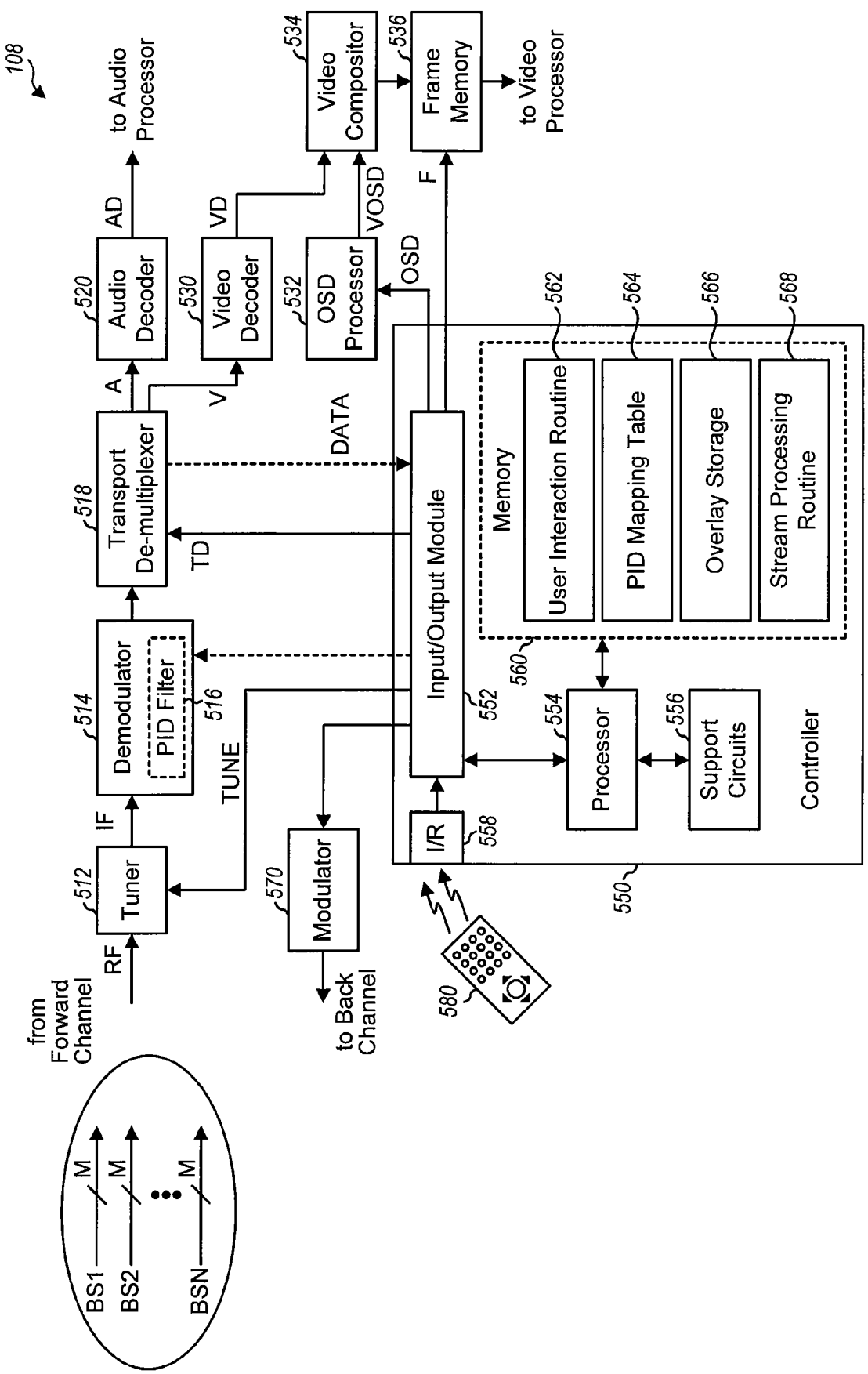
FIG. 5 is a block diagram of an embodiment of terminal capable of providing a display of a user interface and implementing various aspects of the invention.

FIG. 5 is a block diagram of an embodiment of terminal 108, which is also referred to as a set top terminal (STT) or user terminal. Terminal 108 is capable of producing a display of a user interface and implementing various aspects of the invention. Terminal 108 includes a tuner 512, a demodulator 514, a transport demultiplexer (DEMUX) 518, an audio decoder 520, a video decoder 530, an on-screen display (OSD) processor 532, a video compositor 534, a frame store memory 536, a controller 550, and a modulator 570. User interaction is supported via a remote control unit 580. Tuner 512 receives a radio frequency (RF) signal comprising, for example, a number of quadrature amplitude modulated (QAM) signals from a downstream (forward) channel. In response to a control signal TUNE, tuner 512 tunes to and processes a particular QAM signal to provide an intermediate frequency (IF) signal. Demodulator 514 receives and demodulates the IF signal to provide an information stream (e.g., an MPEG transport stream) that is sent to transport stream demultiplexer 518.

Transport stream demultiplexer 518, in response to a control signal TD produced by controller 550, demultiplexes (i.e., extracts) an audio stream A and a video stream V. The audio stream A is provided to audio decoder 520, which decodes the audio stream and provides a decoded audio stream to an audio processor (not shown) for subsequent processing and presentation. The video stream V is provided to video decoder 530, which decodes the compressed video stream V and provides an uncompressed video stream VD to video compositor 534. OSD processor 532, in response to a control signal OSD produced by controller 550, produces a graphical overlay signal VOSD that is provided to video compositor 534.

Video compositor 534 merges the graphical overlay signal VOSD and the uncompressed video stream VD to produce a composed video stream (i.e., the underlying video images with the graphical overlay). Frame store unit 536 receives and stores the composed video stream on a frame-by-frame basis according to the frame rate of the video stream. Frame store unit 536 thereafter provides the stored video frames to a video processor (not shown) for subsequent processing and presentation on a display device. In an embodiment, during transitions between streams for a user interface, the buffers in the terminal are not reset, and the user interface seamlessly transitions from one screen to another.

Controller 550 includes an input/output (I/O) module 552, a processor 554, support circuitry 556, an infrared receiver (I/R) 558, and a memory 560. Input/output module 552 provides an interface between controller 550 and tuner 512, demodulator 514 (for some designs), transport demultiplexer 518, OSD processor 532, frame store unit 536, modulator 570, and a remote control unit 580 via infrared receiver 558.

Processor 554 interfaces with I/O module 552, support circuitry 556 (which may include power supplies, clock circuits, cache memory, and the like), and a memory 560. Processor 554 also coordinates the execution of software routines stored in memory 560 to implement the features and perform the functions supported by the terminal.

Memory 560 stores software routines that support various functions and features, and further stores data that may be used for the user interface. In the embodiment shown in FIG. 5, memory 560 includes a user interaction routine 562, a PID mapping table 564, an overlay storage 566, and a stream processing routine 568. User interaction routine 562 processes user interactions to perform various functions to provide the desired user interface menu. For example, user interaction routine 562 can implement a mask or reveal feature to display (reveal) the desired portion of the IPG page and hide (mask) the undesired portion. User interaction routine 562 may further perform various functions to achieve a demand-cast for a desired IPG page. The mask or reveal is described in U.S. patent application Ser. Nos. 09/293,526 and 09/533,006.

Stream processing routine 568 coordinates the recombination of video streams to form the desired video sequences. Stream processing routine 3468 employs a variety of methods to recombine slice-based streams, some of which are described in the aforementioned U.S. patent application Ser. No. 09/686,739. In one recombination method, a PID filter 516 within demodulator 514 is utilized to filter the undesired PIDs and retrieve the desired PIDs from the transport stream. The packets to be extracted and decoded to form a particular IPG page are identified by PID mapping table 564. For most recombination methods, after stream processing routine 568 has processed the streams into the proper order, the slices are sent to video decoder 530 (e.g., an MPEG-2 decoder) to form uncompressed IPG pages suitable for display.

Although controller 550 is depicted as a general-purpose processor that may be programmed to perform specific control functions to implement various aspects of the invention, the controller may also be implemented in hardware as an application specific integrated circuit (ASIC).

In a specific design, remote control unit 580 includes an 8-position joystick, a numeric pad, a "Select" key, a "Freeze"

key, and a "Return" key. User manipulations of the joystick or keys on the remote control device are transmitted to controller 550 via an infrared (IR) link or an RF link. Controller 550 is responsive to the user manipulations and executes the appropriate portion of user interaction routine 562 to process the user manipulations.

FIG. 5 shows a specific design of terminal 108. Other designs of the terminal can also be implemented to perform the functions described herein, and these alternative designs are within the scope of the invention.

F. Multi-Layer User Interface

An aspect of the invention provides techniques for transmitting multiple "slices" of information for a particular location of a video screen. These techniques can be used to provide more information to a viewer for a given limited-size viewing area, and are well suited for interactive program guide (IPG) commonly used for television and broadcast distribution systems. However, the techniques described herein may also be advantageously used for other applications and other guides such as, for example, dining guide, local shopping, news, and others.

For clarity, many aspects and embodiments of the invention are described below in the context of an interactive program guide provided via a number of IPG pages. Referring back to FIG. 2A, an IPG page can be designed having a number of regions (or portions). Each region can be used to provide a different type of information. Each region is typically defined to be of a specific size and shape and is further placed at a specific location on the IPG page. The specific size, shape, and location of each region and the arrangement of the regions on the IPG page are typically selected based on the desired IPG page design.

Figure 6:
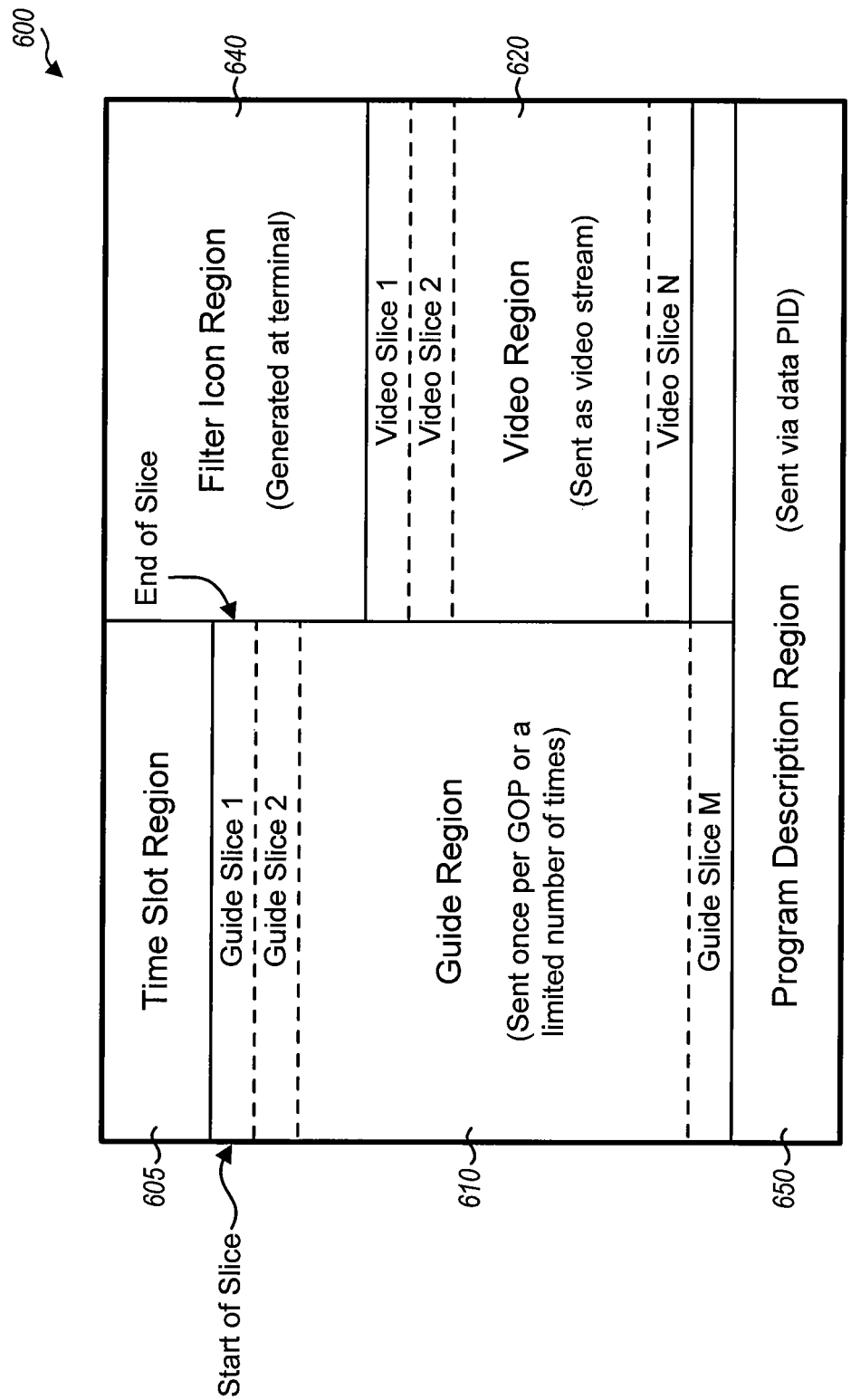
FIG. 6 is a diagram of a specific design of an IPG page that can be used to illustrate various aspects and embodiments of multiple slices transmission.

FIG. 6 is a diagram of a specific design of an IPG page 600 that can be used to illustrate various aspects and embodiments of the invention. As shown in FIG. 6 and described above, the IPG page can be partitioned into a number of regions including a guide region 610, a video region 620, a filter icon region 640, and a program description region 650.

As described in the aforementioned U.S. patent application Ser. No. 09/686,739, various techniques can be used to reduce the amount of data to be transmitted from the head-end to the terminals for the IPG page. For example, a video stream for video region 620 can be continually transmitted from the head-end to the terminals, guide data for guide region 610 can be transmitted continually (e.g., once for each GOP) or a limited number of times, and the data in program description region 650 can be transmitted via a data stream.

To efficiently encode and transmit the regions of the IPG page, each transmitted region can be defined with a set of slices. As shown in FIG. 6, guide region 610 can be defined with a set of M guide slices and video region 620 can be defined with a set of N video slices. Other regions may also be defined with their respective sets of slices, and arbitrary slice shapes can be defined for any region. Note that in MPEG-2, a slice cannot be defined exceeding a macroblock row and this is within the scope of the invention. Slice-based encoding, temporal slice persistence encoding, or strobecast encoding method can then be applied to encode and transmit the content from the head-end.

For the IPG page design shown in FIG. 2A, the guide listing 214 for each channel, which is also referred to as a channel element, can be defined as a guide slice. Each guide slice is associated with a specific location in the guide region of the page and typically includes a slice start code that identifies the start and the end of the slice. The M guide slices for the M channel elements of the guide region can be encoded (e.g., a priori) at the head-end, stored in a storage unit, and transmitted to the terminal as needed. By processing the slice start code, a decoder at the terminal is able to determine where to place the decoded slice on the IPG page, which can be used in any of slice-based, temporal slice-persistence, and strobecast encoding methods.

In accordance with an aspect of the invention, multiple slices can be associated with a particular location of the IPG page. These multiple slices can be used to present more information (i.e., content) in a given spatial area of the IPG page.

Multiple slices can be defined for each channel element of the guide region to provide additional information about program titles or selectively different information. In one embodiment, each channel element may first be associated with a respective slice that provides the guide data for the channel (e.g., the channel number, channel short name, and program title, as shown in FIG. 2A). Each channel element may further be associated with another slice that provides, for example, a short description of the program that may be initiated, e.g., upon the viewer selecting a related object.

Multiple slices may be interchangeably provided for the channel listings to provide a slow-moving listing. This same "slice-looping" behavior may be applied to banners or other objects in other regions of the user interface (e.g., to catch the attention of the viewer). In general, for each slice location, multiple slices of information can be encoded to provide alternative or additional information.

Various techniques can be used to present the multiple slices in an intelligible manner while reducing the amount of clutter. The presentation of the additional slices can also be in different manner, such as looping and text extension depending on the desired user interface functionality.

1. Delivery and Presentation Schemes

The delivery and presentation of the multiple slices for a particular location of the IPG page can be achieved based on numerous schemes, some of which are described below.

Figure 7A:
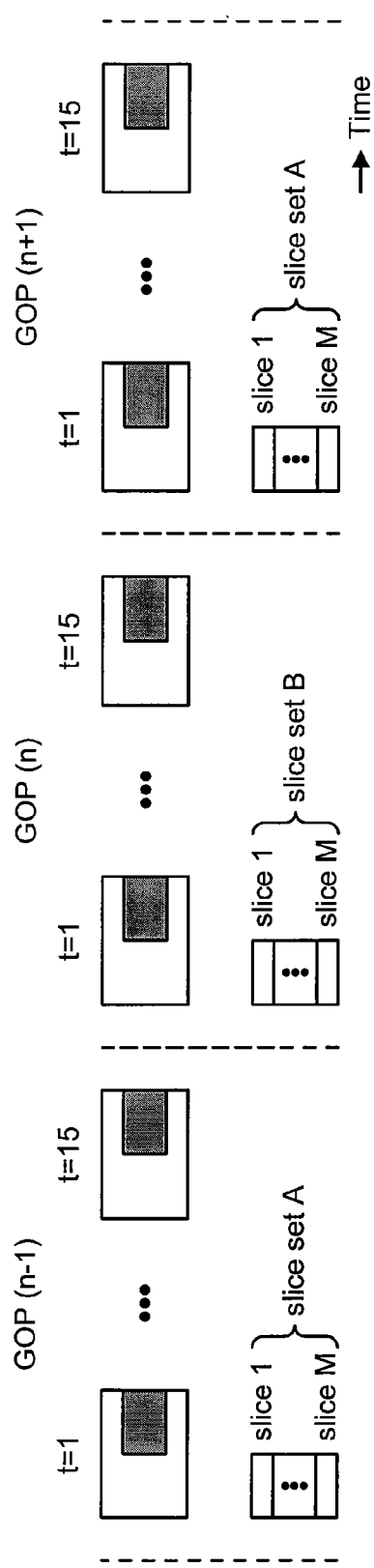
FIGS. 7A through 7C are diagrams that illustrate various slice delivery and presentation schemes whereby multiple slices are transmitted for a particular location of an IPG page.

FIG. 7A is a diagram that illustrates a first slice delivery and presentation scheme whereby multiple slices for a particular location of an IPG page are transmitted from the head-end at different times. In the example shown in FIG. 7A, a video sequence containing only slices that belong to the video region of the IPG page (i.e., the portion containing time-varying information) is coded, assigned a particular PID, and transmitted from the head-end. The guide portion (i.e., the portion containing the information specific to that IPG page) is coded as a set of slices, assigned another PID, and also transmitted from the head-end.

Each of the multiple slices can be used to provide different information to the terminals. The multiple slices can be transmitted at different GOP times, and the slices can be appropriately time stamped for presentation at the desired GOP times. In the example shown in FIG. 7A, two different slices are alternately provided for a particular channel element of the IPG page (i.e., a particular slice location) at different GOP times. For the first guide slice location, a first slice (e.g., slice 1 in set A) can be time stamped for presentation at a first GOP time, a second slice (e.g., slice 1 in set B) can be time stamped for presentation at the next GOP time, the first slice (e.g., slice 1 in set A) can be time stamped for presentation at the following GOP time, and so on. Any number of slice sets (e.g., A, B, C, and so on) can be time division multiplexed (TDM) and this is within the scope of the invention. Moreover, the TDM can be achieved based on any particular transmission pattern, and needs not be a regular repeating pattern. For example, the second slice may be transmitted for every P times the first slice is transmitted.

In an embodiment, each transmission (e.g., at each GOP) for a particular IPG page may include a complete set of guide slices for the guide region of the IPG page (e.g., guide slices 1 through M, for slice locations 1 through M, respectively). Alternatively, a transmission may include a partial set of guide slices for the guide region (e.g., just the guide slices that are new for the GOP). For guide slices transmitted once per GOP, these slices can be intra-coded in the manner described above in the aforementioned U.S. patent application Ser. No. 09/686,739.

In an embodiment, the terminal processes the received guide slices and can continually update the IPG page as new slices are received for the page. As described above, since the guide data is typically static over time, one set of intra-coded slices for the guide data can be transmitted by the head-end for each GOP. In this case, the processing at the terminal for the guide region can be achieved on a GOP-by-GOP basis. For each GOP, the terminal recombines the guide slices with other slices for the IPG page (e.g., the video slices), decodes the recombined slices, and displays the decoded slices. If a particular guide slice is not transmitted for the current GOP, the terminal can skip the non-transmitted slice and not update the slice previously decoded for this location, as described in the aforementioned U.S. patent application Ser. No. 09/686, 739. By presenting multiple slices for a particular location in a time division multiplexed manner, more content can be displayed within a particular spatial region.

The guide slices can be encoded, time stamped, transmitted, and decoded in the manner described in the aforementioned U.S. patent application Ser. No. 09/686,739. Encoding and decoding techniques for guide slices transmitted a limited number of times (e.g., once) is described in the aforementioned U.S. patent application Ser. No. 09/686,739.

Figure 7B:
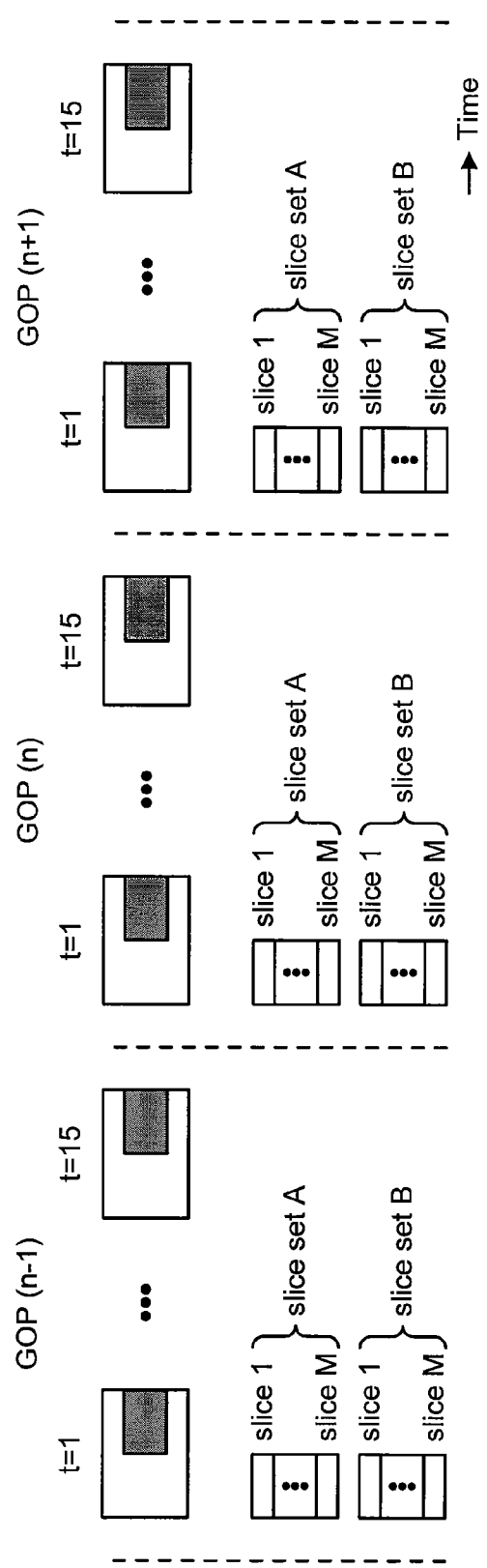

FIG. 7B is a diagram that illustrates a second slice delivery and presentation scheme whereby multiple slices are concurrently transmitted for a particular location of an IPG page. For this scheme, the terminal can receive the transmitted slices, select one of the multiple slices for processing, and process and display the selected slice.

The guide slice to be displayed at a particular location on the IPG page may be selected, for example, based on user interaction. In an embodiment, the slices for the channel elements of the guide listing (e.g., slice set A) can be initially processed and displayed. The viewer can thereafter highlight a particular channel element, for example, by clicking on the channel element. In response to the user selection, the terminal can retrieve, process, and display another slice (e.g., slice 1 in set B) for the highlighted channel element. The particular slice selected for decoding and display may be based, for example, on the particular key selected by the viewer. In an embodiment, only the highlighted channel element may be updated in response to the user interaction, and the other channel elements in the guide region need not be updated.

The multiple slices for the particular location may be transmitted in the same GOP time (as shown in FIG. 7B) or may be transmitted at different GOP times. Although two slice sets are illustratively shown in FIG. 7B, any number of slice sets may be transmitted for the guide region of the IPG page. Furthermore, the transmission at any particular GOP time may include a full or partial set of slices for the guide region.

Figure 7C:
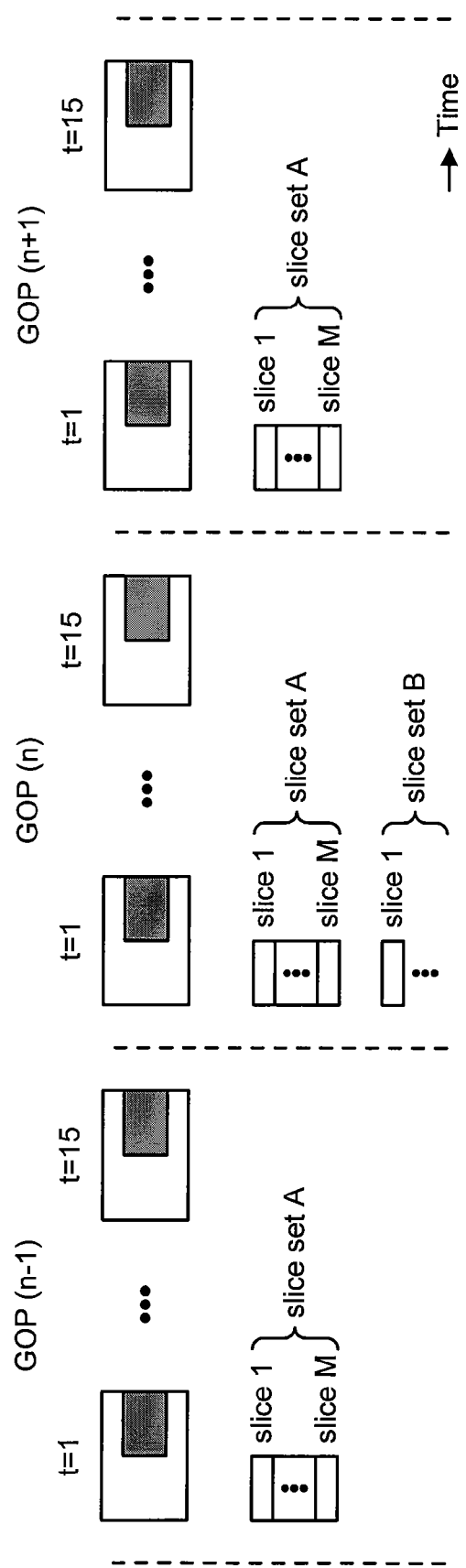

FIG. 7C is a diagram that illustrates a third slice delivery and presentation scheme whereby one slice is transmitted for a particular location, and additional slices can be transmitted by the head-end upon receiving a request from the terminal. This third scheme is similar to the second scheme described above, except that the additional slices are not transmitted from the head-end until requested by the terminal. This scheme utilizes less bandwidth for the broadcast slices than the second scheme, but requires (e.g., out-of-band or in-band) signaling to send requests for slices.

At the terminal, the transmitted (e.g., broadcast) slices are initially received, processed, and displayed. Upon receiving an indication to display a different slice for a particular location of the IPG page, the terminal can send a request for the selected slice to the head-end. The head-end processes the request and sends the requested slice back to the terminal, which then processes and presents the slice. The requested slice can be transmitted a limited number of times (e.g., once) in response to the request, as described in the aforementioned U.S. patent application Ser. No. 09/687,662.

In accordance with MPEG-2 standard, each slice typically is associated with a slice start code that defines the start location and the stop location for the slice. Typically, the slice is decoded and presented at a particular location in the screen identified by the slice start code. In one embodiment, the transport stream can include multiple of slice start codes for a particular slice, and the terminal can select one of the slice start codes for the slice. With this embodiment, the slice can be placed at the location defined any of the transmitted slice start codes. In another embodiment, the head-end can defined the slice start code for a particular slice based on user interaction at the terminal. In yet another embodiment, the terminal is able to arrange (i.e., modify) the slice start codes such that the slice can be placed at any desired location in the screen. Various other techniques for presenting the slice at a desired location may also be contemplated and are within the scope of the invention.

2. PID Assignment

For the above-described slice delivery and presentation schemes, the multiple slices can be assigned to the same or different PIDs, depending on various factors. In a first embodiment, the slices for the guide portion for each IPG page can be assigned to a respective PID. The terminal simply processes the appropriate PID for the guide portion of the selected IPG page and displays all slices transmitted with that PID. This embodiment can be used with the first scheme described above. For example, slices A and B to be presented at a particular location on the IPG page but received at different GOP times may be assigned the same PID.

In a second embodiment, a set of "primary" slices for the guide portion for each IPG page can be assigned one PID, and each set of "secondary" slices for the guide portion for the page can be assigned another respective PID. The terminal can initially process and display the primary slices. If a particular primary slice (e.g., a particular channel element) is highlighted, a second PID can be processed and the secondary slice for the location identified for the highlighted primary slice can be retrieved. The retrieved secondary slice can then be decoded and displayed in place of the highlighted primary slice. Other primary slices are not affected and therefore not updated.

The second embodiment can be used with the second and third schemes described above. For example, for the second scheme shown in FIG. 7B, slice set A can be assigned one PID and slice set B can be assigned another PID. And for the third scheme shown in FIG. 7C, the broadcast slice set A can be assigned one PID and the demand-cast slice set B can be assigned another PID.

For clarity, the use of multiple slices for a particular location of the IPG page has been specifically described for the delivery of program guide data for the guide portion of the IPG page. However, the use of multiple slices can also be applied to other regions of the IPG page, including the video region, the filter icon region, and the program description region. Generally, a primary (or default) set of slices (e.g., slice set A) for a particular region can be sent to the terminal, which initially decodes and presents these slices. One or more secondary (additional) sets of slices (e.g., slice set B) can also be sent for the region to provide additional information. The secondary sets of slices may be decoded and presented in a time division multiplexed manner with the primary set of slices, as shown in FIG. 7A. Alternatively, a particular secondary set of slices (e.g., slice set B) may be decoded and presented in response to an event (e.g., a user interaction).

In general, depending on the encoding scheme employed (e.g., slice-based, temporal slice persistence, strobecast, and so on) and presentation schedule, different PID assignment schemes can be utilized and are within the scope of this invention.

3. Other Aspects

As an example of an application using the above-described aspects of the invention, multiple sets of slices may be sent for multiple video streams. A primary set of slices may be decoded and presented for the IPG page. A secondary set of slices may be decoded and presented, for example, in response to a user selection of a particular filter icon or a particular channel element. An audio stream associated with the selected video stream can also be decoded and presented.

In an embodiment, each slice transmitted from the head-end includes a slice start code that identifies the start and stop locations of the slice. The terminal typically retrieves and processes the transmitted slice and places the decoded slice at the specific location identified by the slice start code.

In an alternative embodiment, the terminal may also elect to display a received slice at a different location than that indicated by the slice start code. The presentation of a particular slice at a different location may be achieved by modifying the slice start code (or some other property of the slice). Presentation of a received slice at different locations (e.g., any location selected by the viewer or terminal) allows the terminal to flexibly generate multiple views and functionality for the user interface.

The viewer or terminal-selected placement of the transmitted slices may be used, for example, to generate a customized IPG page. As an example, slices for the guide listing for all channels in the current time slot may be transmitted. The terminal can generate a custom IPG page by recombining the slices for the desired channel elements (in any desired order). The recombined slices can then be decoded and displayed. The slice start codes may be modified by the terminal such that the slice for each channel element is recombined at the appropriate location in the custom IPG page.

As noted above, the techniques described herein can also be advantageously used for other applications and other guides. For example, the techniques described above can be used to deliver stock quotes, sports scores, headline news, traffic reports, other guides, and so on, which may be displayed, for example, on a portion of a screen via the use of multiple slices for each of these news items. As an example, a first viewer may elect to have stock quotes continually displayed on the bottom portion of the IPG page, and a second viewer may elect to have news flashes continually displayed on the top portion of the IPG page. The news items can be transmitted via multiple slices, and a particular slice can be selected by the viewer and displayed at a designated or viewer-selected location on the IPG page.

The foregoing description of the preferred embodiments is provided to enable any person skilled in the art to make or use the invention. Various modifications to these embodiments will be readily apparent to those skilled in the art, and the generic principles defined herein may be applied to other embodiments without the use of the inventive faculty. Thus, the invention is not intended to be limited to the embodiments shown herein but is to be accorded the widest scope consistent with the principles and novel features disclosed herein.

What is claimed is:

1. A method for providing information for a user interface having included therein a plurality of regions, the method comprising:
    defining a guide region of the user interface using a plurality of slice locations, wherein each slice location corresponds to a respective area and location in the guide region and has a length defined by a predetermined number of contiguous macroblocks in a horizontal row;
    associating a plurality of guide slices for each of at least one slice location in the guide region, each of the guide slices comprising the predetermined number of contiguous macroblocks of guide data;
    independently encoding each guide slice of guide data for each slice location in the guide region; and
    transmitting the encoded guide slices associated with each slice location in the guide region.

2. The method of claim 1, further comprising:
    associating one guide slice for each slice location in the guide region not associated with a plurality of guide slices.

3. The method of claim 1, wherein a plurality of sets of guide slices are transmitted for the plurality of slice locations in the guide region.

4. The method of claim 3, wherein the plurality of sets of guide slices are transmitted via time division multiplexing.

5. The method of claim 3, wherein one set of guide slices is transmitted for each group of pictures (GOP).

6. The method of claim 3, further comprising:
    time-stamping each set of guide slices for presentation at a designated time.

7. The method of claim 3, wherein at least one set of guide slices comprises a partial set of guide slices in the guide region.

8. The method of claim 3, wherein the plurality of sets of guide slices are transmitted with a common packet identifier (PID).

9. The method of claim 3, wherein each of the plurality of sets of guide slices is transmitted with a respective packet identifier (PID).

10. The method of claim 1, wherein the transmitting includes
    continually transmitting a first set of guide slices for the plurality of slice locations in the guide region.

11. The method of claim 10, wherein the transmitting further includes transmitting one or more additional guide slices at a designated time.

12. The method of claim 11, wherein the one or more additional guide slices are transmitted in response to a received request for the additional guide slices.

13. The method of claim 1, wherein the guide slices transmitted for the guide region are intra-coded.

14. The method of claim 1, wherein each transmitted guide slice includes a header indicative of a start location and a stop location for the guide slice.

15. The method of claim 1, wherein each transmitted guide slice includes a guide listing for a particular channel in the user interface.

16. A method for providing information for a user interface, comprising:
    defining a plurality of slice locations for at least a portion of the user interface, wherein each slice location corresponds to a respective area and location in the user interface and has a length defined by a predetermined number of contiguous macroblocks in a horizontal row;

associating a plurality of slices for each of at least one slice location in the user interface, each of the slices comprising the predetermined number of contiguous macroblocks of data;

independently encoding each slice of data for each slice location in the user interface; and transmitting the encoded slices associated with each slice location in the user interface;

wherein the one or more encoded slices for each slice location includes guide data for an interactive program guide.

17. A terminal configured to provide a user interface having includes therein a plurality of regions, comprising:
- a demodulator operative to receive and demodulate a modulated signal to provide a transport stream;
- a transport de-multiplexer coupled to the demodulator and operative to receive and process the transport stream to provide a sequence of packets for a plurality of slices for a guide region of the user interface, wherein each slice is designated for presentation at a particular slice location in the guide region and has a length defined by a predetermined number of contiguous macroblocks in a horizontal row, and wherein multiple slices are transmitted for each of at least one slice location in the guide region, each of the guide slices comprising the predetermined number of contiguous macroblocks of guide data; and
- at least one video decoder coupled to the transport de-multiplexer and operative to receive and independently decode the sequence of packets of each slice to form the guide region of the user interface.

18. The terminal of claim 17, further comprising:
- a controller operative to receive a user selection for a particular slice location in the guide region and to direct the transport de-multiplexer to retrieve, from the transport stream, packets for an additional slice associated with the selected slice location, and
- wherein the at least one video decoder is further operative to decode the retrieved packets for the additional slice to form an updated user interface having included therein the additional slice.

* * * * *